US010037704B1

(12) United States Patent
Myr

(10) Patent No.: US 10,037,704 B1
(45) Date of Patent: Jul. 31, 2018

(54) AUTOMATIC REAL-TIME AIR TRAFFIC CONTROL SYSTEM AND METHOD FOR MAXIMIZING LANDINGS / TAKEOFFS CAPACITY OF THE AIRPORT AND MINIMIZING AIRCRAFTS LANDING TIMES

(71) Applicant: David Myr, Jerusalem (IL)

(72) Inventor: David Myr, Jerusalem (IL)

( * ) Notice: Subject to any disclaimer, the term of this patent is extended or adjusted under 35 U.S.C. 154(b) by 0 days.

(21) Appl. No.: 15/421,457

(22) Filed: Feb. 1, 2017

(51) Int. Cl.
*B64F 1/00* (2006.01)
*G08G 5/00* (2006.01)
*G08G 5/02* (2006.01)

(52) U.S. Cl.
CPC .......... *G08G 5/0043* (2013.01); *B64F 1/002* (2013.01); *G08G 5/0013* (2013.01); *G08G 5/025* (2013.01)

(58) Field of Classification Search
None
See application file for complete search history.

(56) References Cited

U.S. PATENT DOCUMENTS

| | | | | |
|---|---|---|---|---|
| 9,424,755 B2* | 8/2016 | Bailey | ............... | G08G 5/0039 |
| 9,530,320 B2* | 12/2016 | Bailey | ............... | G08G 5/0013 |
| 9,558,672 B2* | 1/2017 | McCann | ............ | G08G 5/0039 |
| 9,607,520 B2* | 3/2017 | McCann | ............ | G08G 5/0039 |
| 9,625,261 B2* | 4/2017 | Polansky | ............ | G05D 1/0005 |
| 9,697,737 B2* | 7/2017 | Hale | ................. | G08G 5/0026 |
| 9,704,406 B1* | 7/2017 | Young | .............. | G08G 5/0039 |
| 9,728,091 B2* | 8/2017 | Shay | .................. | G08G 5/02 |
| 9,734,723 B1* | 8/2017 | Bruno | .............. | G08G 5/0039 |
| 9,741,254 B2* | 8/2017 | Navarro | ............ | G08G 5/0052 |
| 9,766,630 B2* | 9/2017 | Casado Magana | .. | G05D 1/0676 |
| 9,824,596 B2* | 11/2017 | Arbeit | ............. | G08G 5/0069 |
| 2003/0093187 A1* | 5/2003 | Walker | ............. | B64C 13/20 701/1 |
| 2008/0103646 A1* | 5/2008 | Lucas | .............. | G08G 5/0039 701/14 |
| 2008/0161982 A1* | 7/2008 | Coulmeau | ........ | G01C 23/00 701/3 |
| 2008/0177432 A1* | 7/2008 | Deker | ............... | G01C 21/00 701/17 |
| 2009/0112535 A1* | 4/2009 | Phillips | ............ | G06Q 10/04 703/2 |
| 2009/0210109 A1* | 8/2009 | Ravenscroft | ....... | G01C 21/005 701/26 |

(Continued)

Primary Examiner — Truc M Do

(57) ABSTRACT

The invention discloses a computerized method, system and device for maximizing airport landing and takeoff capacity by generating an optimized landings and takeoffs schedule for a plurality of aircrafts located in a vicinity of a specific airport by determining an optimal four dimensional (4D) trajectory for efficient landing/takeoff sequence and time schedule.
The aircrafts are separated by the number of parameters to ensure safety for the aircrafts according to the updated FAA/EASA standards. Accordingly, the model disclosed in the invention works under current FAA/EASA runway usage, precedence and time constrains.
Special Takeoffs Traffic Lights System is additionally disclosed, wherein Traffic Lights will be installed on the runway to increase the landing/takeoff safety, such traffic lights will have changing green/red colors on vacancy/occupancy of the specific runway.
The system could be used either as an automatic system or as a decision-support system for ATC personnel.

12 Claims, 9 Drawing Sheets

(56) References Cited

U.S. PATENT DOCUMENTS

| | | | |
|---|---|---|---|
| 2010/0217510 A1* | 8/2010 | Deker | G08G 5/025 701/120 |
| 2010/0292871 A1* | 11/2010 | Schultz | G01C 21/00 701/3 |
| 2011/0224845 A1* | 9/2011 | Perry | B64F 1/22 701/2 |
| 2011/0295501 A1* | 12/2011 | Gutierez-Castaneda | G05D 1/0005 701/528 |
| 2011/0313598 A1* | 12/2011 | Coulmeau | G08G 5/0039 701/3 |
| 2012/0116614 A1* | 5/2012 | Torres | G08G 5/0013 701/3 |
| 2012/0158219 A1* | 6/2012 | Durling | G01S 5/0072 701/4 |
| 2012/0158280 A1* | 6/2012 | Ravenscroft | G01C 21/005 701/400 |
| 2012/0191332 A1* | 7/2012 | Sawhill | G08G 5/0013 701/120 |
| 2012/0203564 A1* | 8/2012 | Myr | G06Q 10/06 705/2 |
| 2012/0209515 A1* | 8/2012 | Klooster | G08G 5/0013 701/439 |
| 2012/0215433 A1* | 8/2012 | Subbu | G06Q 10/047 701/120 |
| 2012/0215434 A1* | 8/2012 | Subbu | G08G 5/0013 701/120 |
| 2012/0215435 A1* | 8/2012 | Subbu | G08G 5/0013 701/120 |
| 2012/0245834 A1* | 9/2012 | Klooster | G08G 5/0034 701/120 |
| 2013/0006450 A1* | 1/2013 | Del Amo Blanco | G08G 5/0034 701/14 |
| 2013/0006512 A1* | 1/2013 | Saggio, III | G08G 5/0013 701/120 |
| 2013/0006533 A1* | 1/2013 | Lax | G08G 5/0091 702/3 |
| 2013/0085661 A1* | 4/2013 | Chan | G05D 1/104 701/122 |
| 2013/0184978 A1* | 7/2013 | Subbu | G08G 5/0013 701/120 |
| 2014/0032095 A1* | 1/2014 | Courteville | G01C 23/00 701/400 |
| 2015/0057915 A1* | 2/2015 | La Civita | G08G 5/0026 701/120 |
| 2015/0120100 A1* | 4/2015 | Sacle | G01C 21/20 701/18 |
| 2016/0275801 A1* | 9/2016 | Kopardekar | G08G 5/0043 |

* cited by examiner

Fig. 1a General System Overview
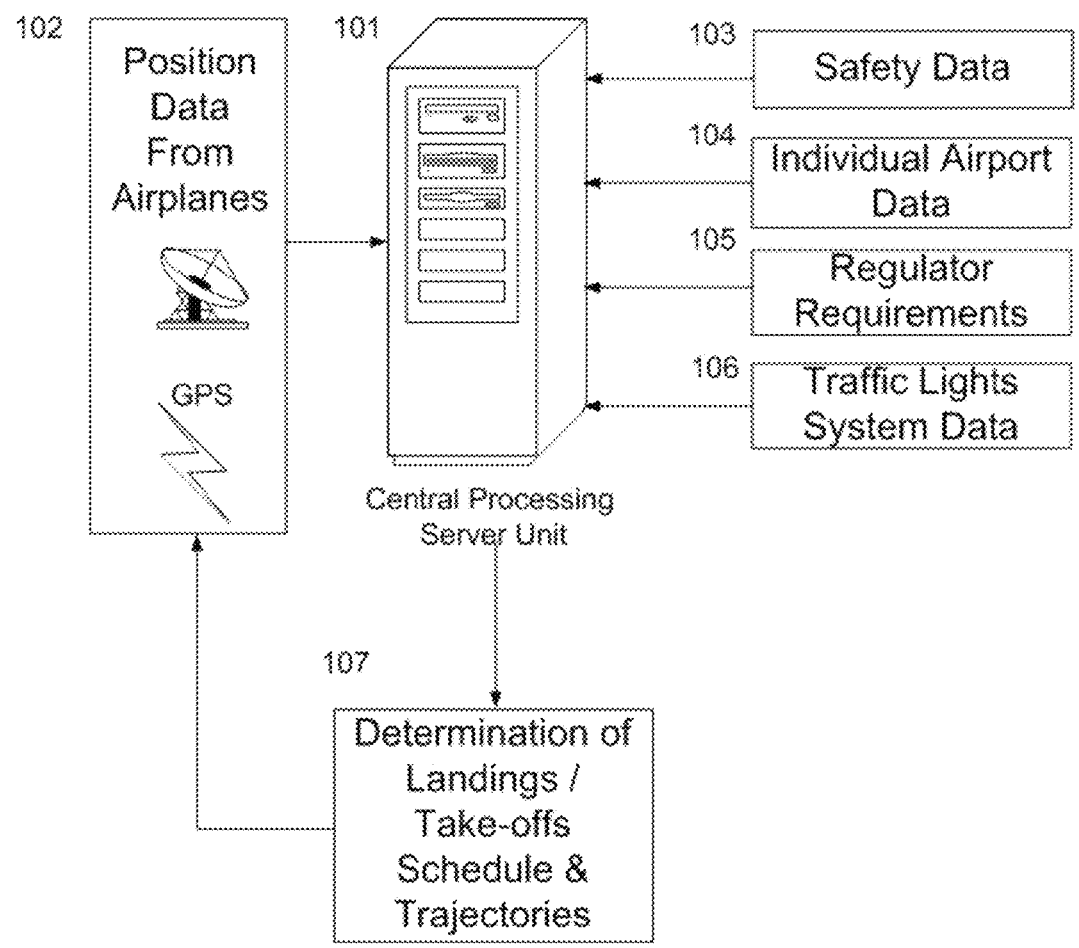

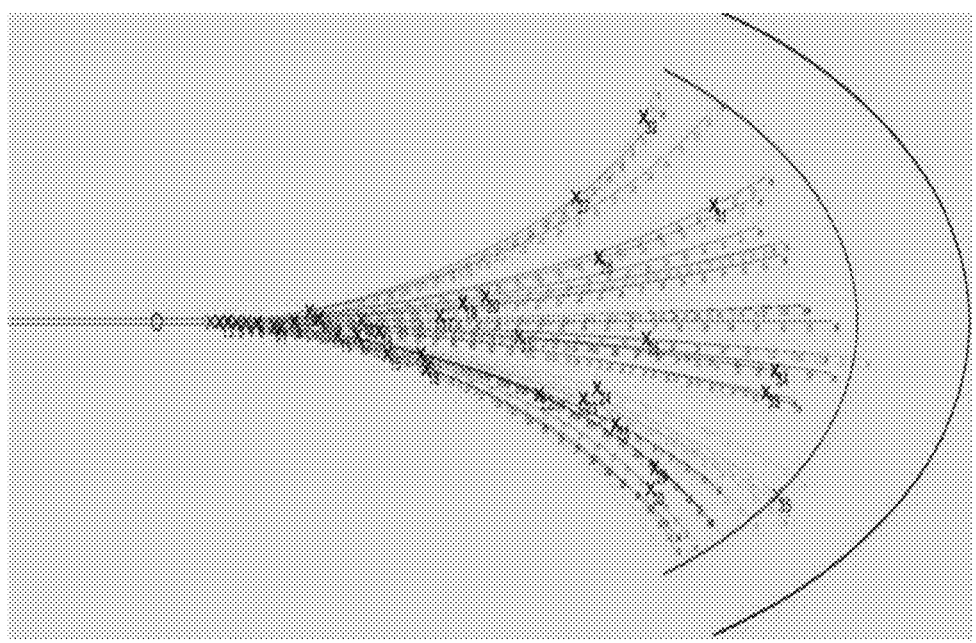
Fig. 1b Identification Lines

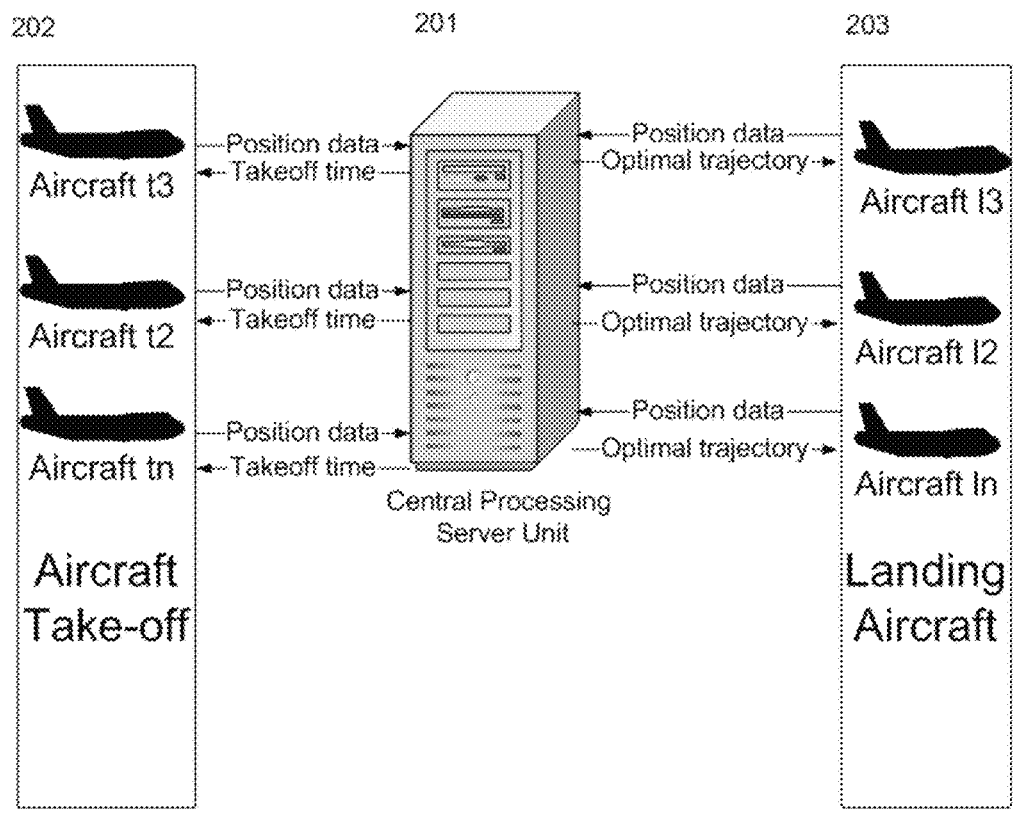
Fig. 2 System Dataflow: Landings and Takeoffs

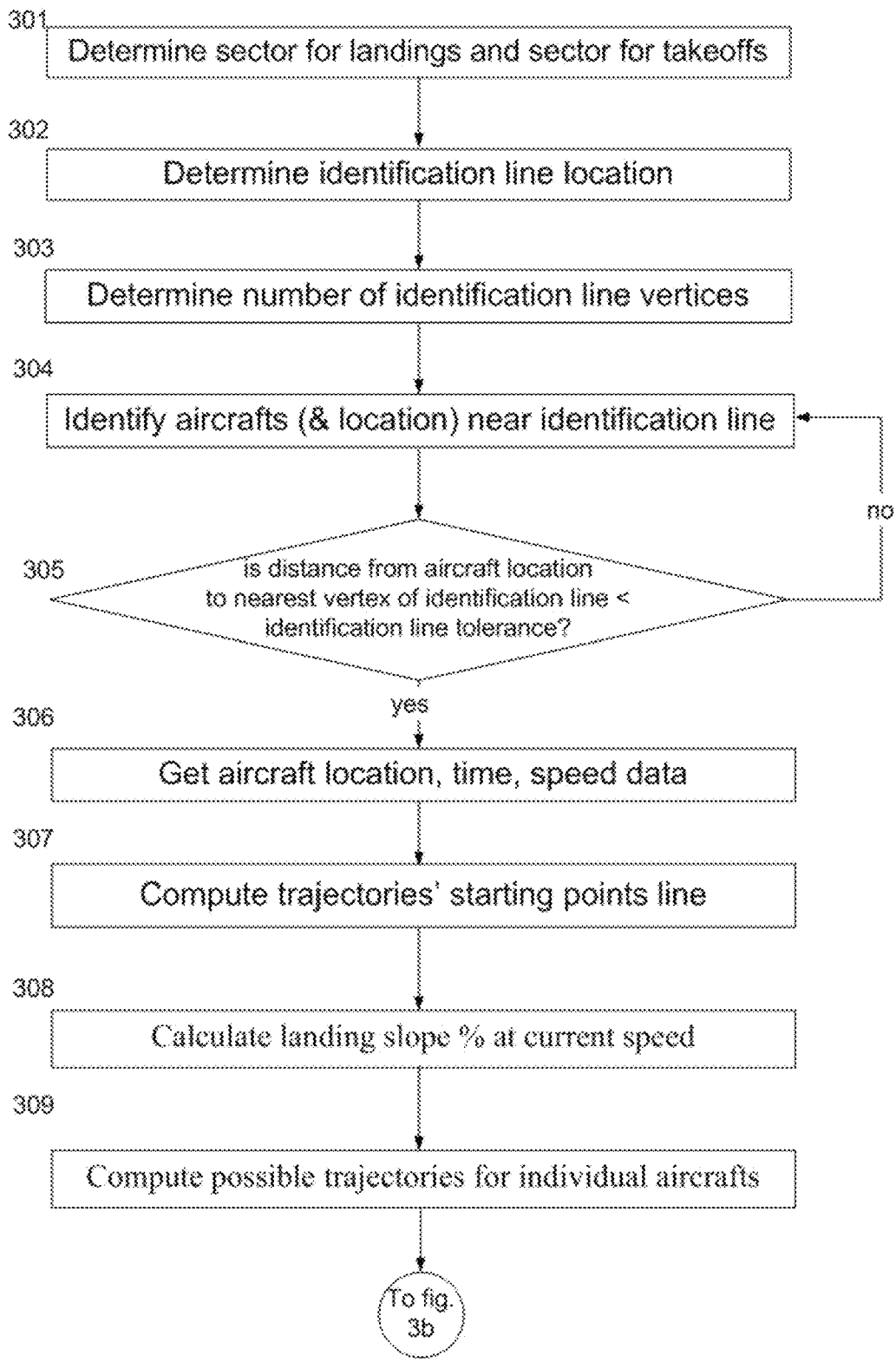
Fig. 3a Optimal Trajectory Determination

Fig. 3b Optimal Trajectory Determination
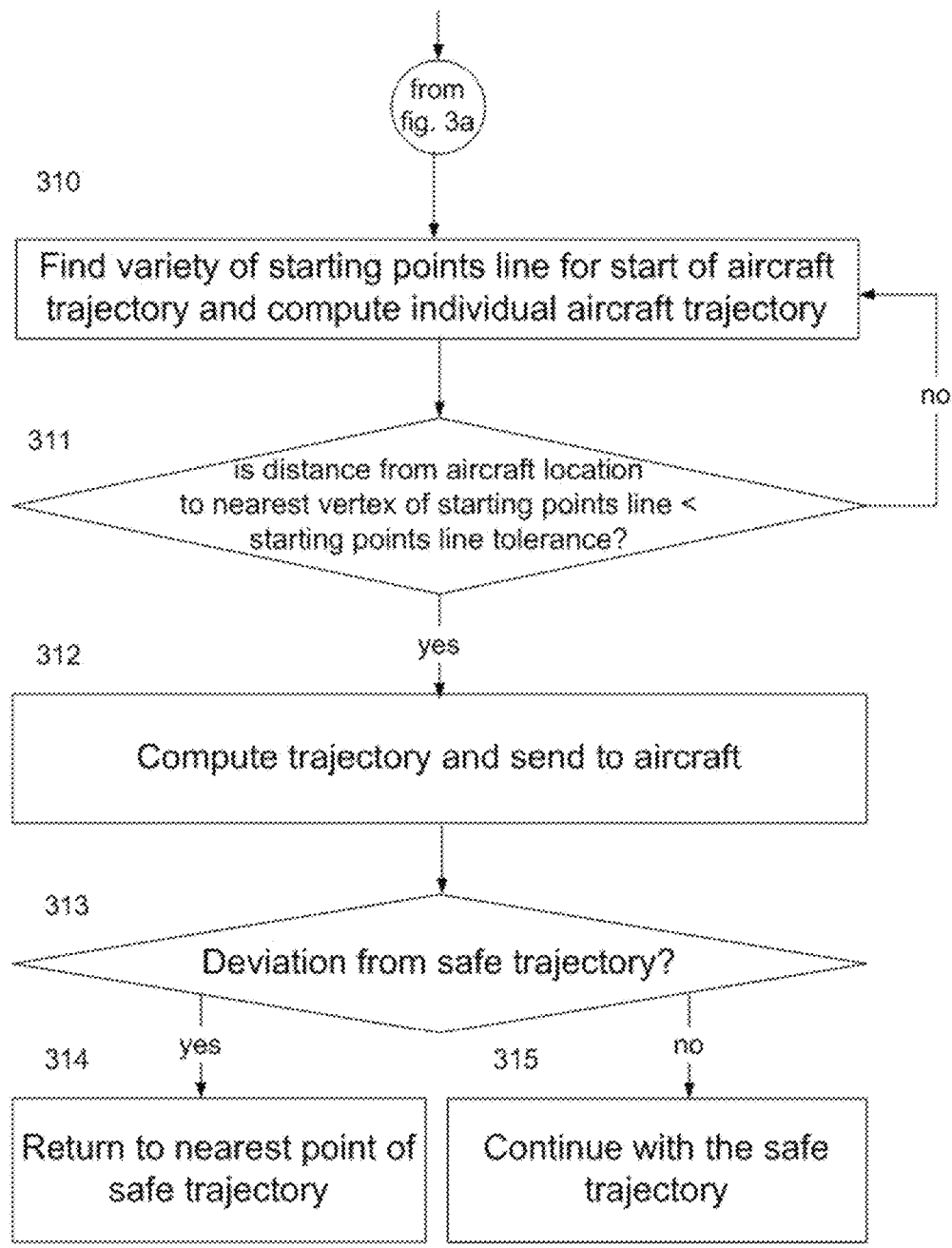

Fig. 4 Five Segments of Landing
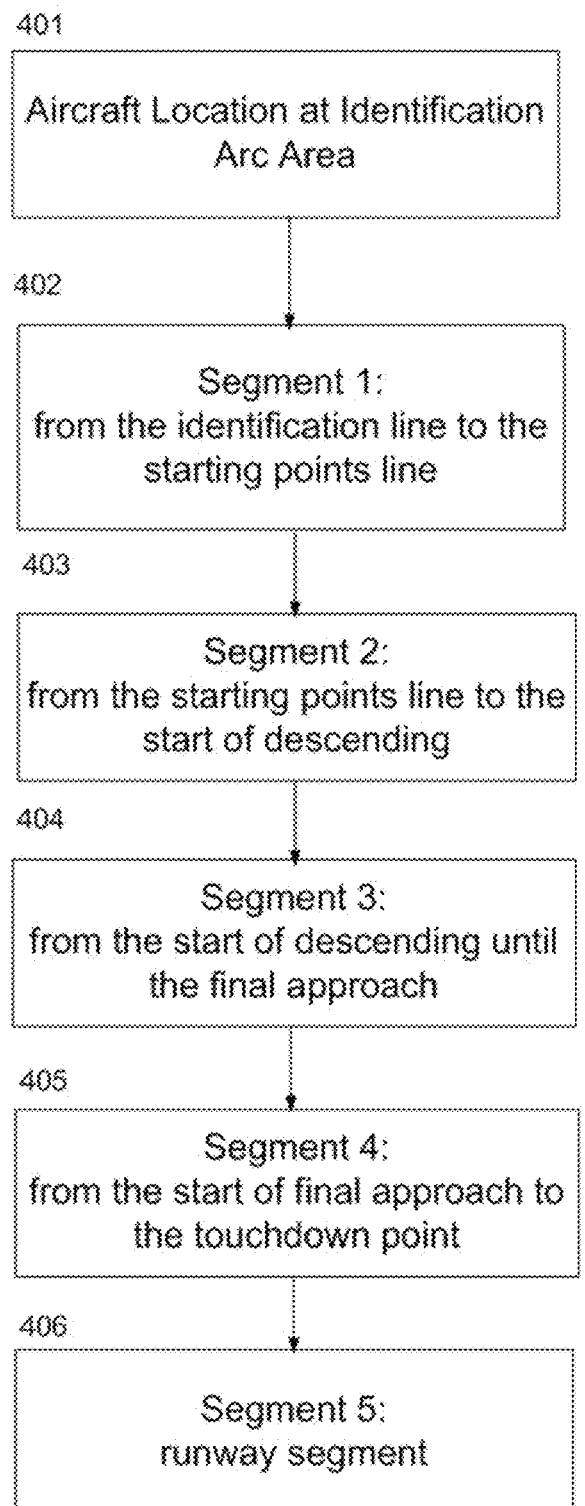

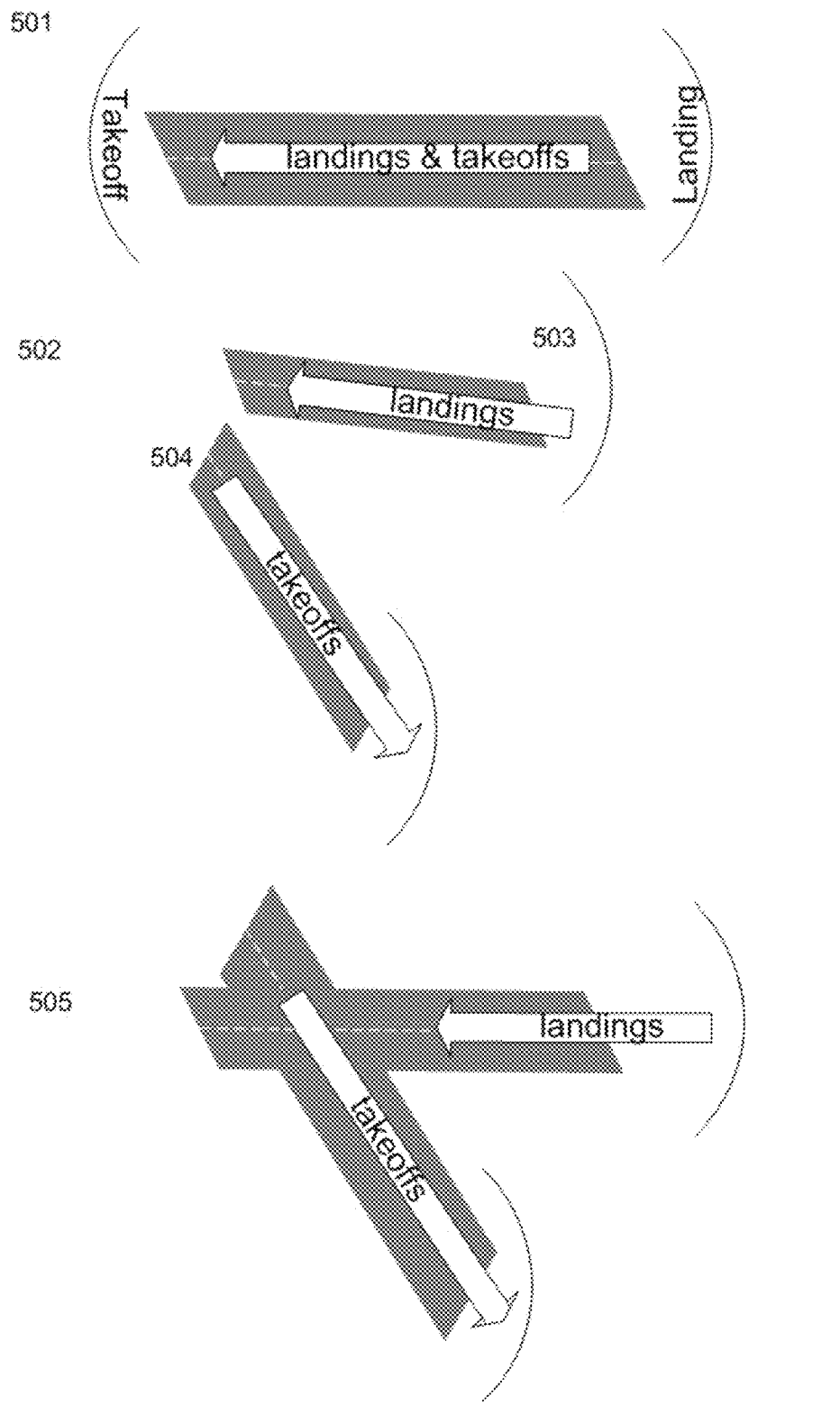

Fig. 5b Identification Arc in Parallel Runway Airport Configuration
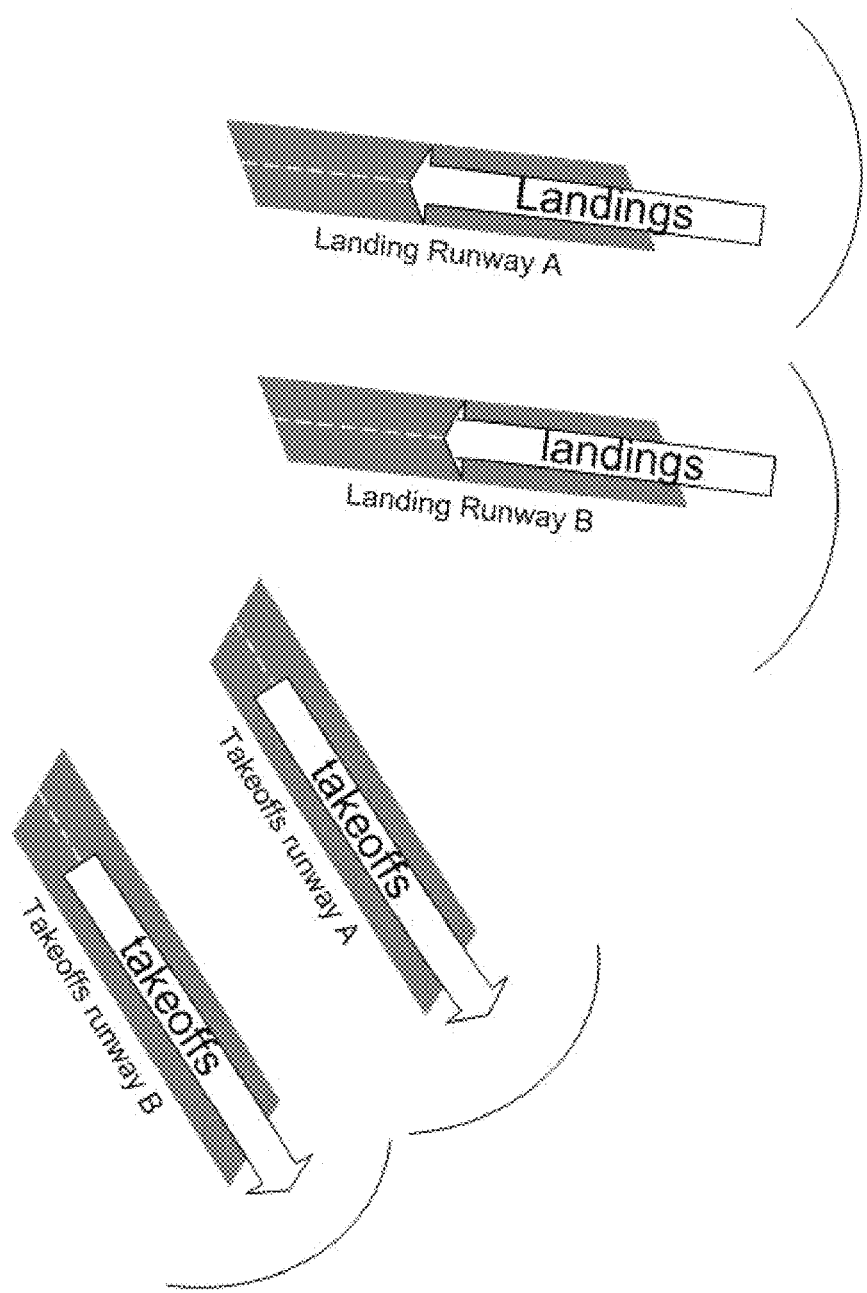

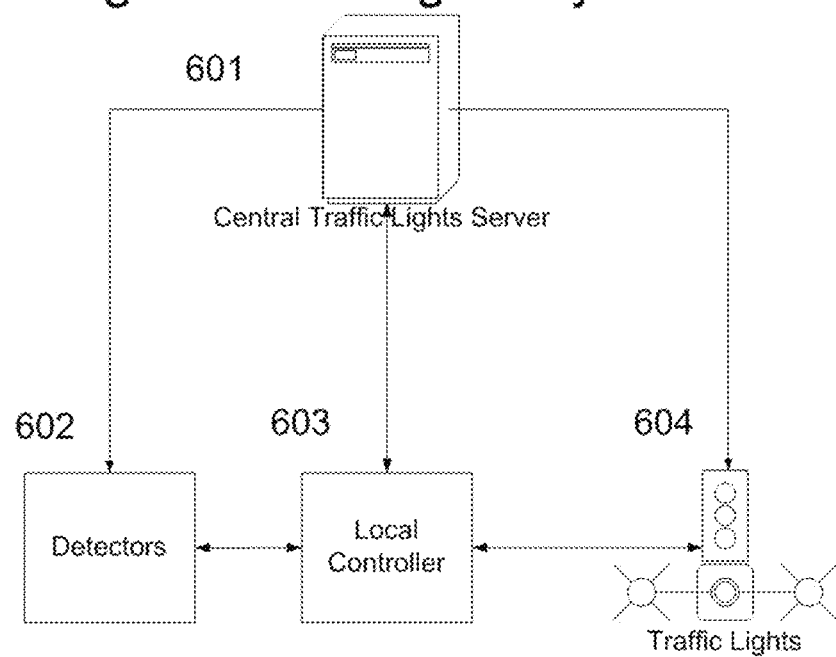

AUTOMATIC REAL-TIME AIR TRAFFIC CONTROL SYSTEM AND METHOD FOR MAXIMIZING LANDINGS / TAKEOFFS CAPACITY OF THE AIRPORT AND MINIMIZING AIRCRAFTS LANDING TIMES

FIELD OF THE INVENTION

This invention relates to computerized Air Traffic Control (ATC) systems. The invention especially relates to the air traffic control optimization at landing/takeoff stage, while complying with a variety of regulatory and safety requirements.

REFERENCES

US Patent Documents

Kirk U.S. Pat. No. 6,604,044
Paielli U.S. Pat. No. 7,650,232
Lewis U.S. Pat. No. 7,877,197
Eagles U.S. Pat. No. 8,401,773
Goodman U.S. Pat. No. 8,417,396
Subbu U.S. Pat. No. 8,942,914
Sawhill U.S. Pat. No. 8,965,672
Shay U.S. Pat. No. 9,536,435
Shiomi US 20050035898
Bailey US 20090157288
Roberts US 20090012660
Torres US 20120116614
Scott US 20130317731
Subbu US 20130184978
Bertsimas US 20130013182
De Prince US 20150269846

Foreign Patent Documents

Janes WO 2007072015

Articles

Alessandro Gardi: "Automated ATM System for 4-Dimensional Trajectory Based Operations"
Shenpeng Yu: "A Real-time Schedule Method for Aircraft Landing Scheduling Problem Based on Cellular Automaton"
Heinz Erzberger: "Design Principles and Algorithms for Automated Air Traffic Management"
Liang Man: "An Agent-based Approach to Automated Merge 4D Arrival Trajectories in Busy Terminal Maneuvering Area"
John-Paul B. Clark: "Investigation, Modeling, and Analysis of Integrated Metroplex Arrival and Departure Coordination Concepts"
Navinda Kithmal Wickramasinghe: "Flight trajectory optimization for an efficient air transportation system".
Culligan: "Three-Dimensional flight experiments using on-line mixed-integer linear programming trajectory optimization".
Ryan Howe-Veenstra: "Commercial Aircraft Trajectory Optimization and Efficiency of Air Traffic Control Procedures"
Hok K. Ng: "Optimizing Aircraft Trajectories with Multiple Cruise Altitudes in the Presence of Winds"
M. Selim Aktürk: "Aircraft Rescheduling with Cruise Speed Control"
Daniel Work: "Convex Formulations of Air Traffic Flow Optimization Problems"
Xie: "Landing Safety Analysis of An Independent Arrival Runway"
Patrick Hagelauer: "A soft dynamic programming approach for on-line aircraft 4D-trajectory optimization"
Zhi Yuana et al: "Mixed Integer Second-Order Cone Programming for the Horizontal and Vertical Free-flight Planning Problem" also provides programming approach for on-line aircraft 4D-trajectory optimization"
Daniel Delahaye: "Mathematical Models for Aircraft Trajectory Design: A Survey"
Howe-Veenstra: "Commercial Aircraft Trajectory Optimization and Efficiency of Air Traffic Control Procedures"
Yokoyama: "Flight Trajectory Optimization Using Genetic Algorithm Combined with Gradient Method"
Bakolas: "Initial Guess Generation for Aircraft Landing Trajectory Optimization"

Need for the Invention/Advantages of the Invention

The continuous expansion of the air transportation business has put a huge strain on the aviation system with airport maximal capacity is becoming a limiting factor in meeting the rising demand for more flights. Due to the increasing number of flights, air traffic control in busy airports is one of the main challenges affecting the airport capacity.

According to the On-Time Arrival Performance National report, approximately 25% of all flights in the United States were delayed in 2014, while half of those delays were categorized mainly as volume-delays. The resulting delays have a significant economic impact, as the Federal Aviation Administration (FAA) estimates that flight delays cost airlines $22 billion yearly in the US.

In 2015, the direct cost of aircraft block time for U.S. passenger airlines was 65.43 per minute. Increased fuel consumption, aside economic effect, also has an important environmental effect.

Delayed aircraft are estimated to have cost the airlines several billion dollars in additional expense.

The invention is beneficial to the airlines since the reduction in fuel and operating costs, as fuel costs represent up to 30% of an airline's annual operating budget. Studies estimate that flight and air traffic inefficiencies consistently cause aircraft to use 10% more fuel than necessary.

Airports will also be benefited by the increased punctuality of the operative schedules, while passengers will also benefit due to decrease in flight delays.

Since the runway delays (landing/takeoff) is often a bottleneck in an airport system, there is a great interest in optimizing usage of the landing and takeoff processes. By implementing the disclosed invention, airports will benefit from minimizing the runway delays and maximizing the runway capacity, thus the airport capacity is raised, workload on tower controllers is reduced, airlines' fuel consumption and operating costs are reduced, all without the need to construct additional runways.

PRIOR ART

Current Situation and Standards

Aircraft generally file flight plans indicating their routes before takeoff, and from these, the air traffic controllers receive information on the theoretical aircraft trajectories.

The air traffic controllers then are supplied with real-time data on the position of the aircraft from radar screens and ask the pilots for information such as altitude, heading and speed. They instruct the pilots by radio to maintain or change their headings and speeds as well as to maintain safe minimum separation between aircrafts.

Until now, the air traffic tower controllers have been mainly focusing on airports' congestion. The common approach has been delaying the departing flights. Depending on traffic conditions, the controller may place the aircraft into a holding pattern, which is a standard route around each airport, and ask him to wait until the airport can handle the landing.

It is difficult for air traffic controllers to monitor the positions and headings of too many aircraft at one time on conventional equipment, and human controllers make unnecessary mistakes in separating aircraft.

Many airports have a radar control facility that is associated with the airport, TRACON (Terminal Radar Approach Control) in USA. TRACON usually handles traffic in a 30 to 50 nautical mile (56 to 93 km) radius from the airport, with one consolidated TRACON servicing a number of airports in one geographical area. Once the aircraft has left TRACON airspace, it enters a sector of the ARTCC airspace, where it is monitored by at least two air traffic controllers.

Air traffic controllers in the tower monitor takeoffs, landings and ground traffic with visual and radar tools. If the tower controller detects any unsafe condition, a landing aircraft will be told to "go around" and will be re-sequenced into the landing pattern by the terminal area controller. When the local controller determines that it is safe, he gives the pilot clearance to land. The tower controller also monitors the spacing between the aircrafts.

Aircraft already in the air are given the highest priority for use of the runway, compared to aircraft on the ground. The latter aren't in danger of falling out of the sky if they don't get to use the runway. If the inbound aircraft have sufficient fuel reserves, the controllers can manage the inbound flow, and mix the sequence of takeoffs and landings.

For departing aircraft, the first aircraft to ask for start up gets the priority over the next. However, scheduled departures have priority over non-scheduled departures, while military and governmental aircrafts have priority over others.

Airport air traffic tower controllers are responsible for the separation and efficient movement of aircraft operating on the taxiways and runways of the airport itself, and aircraft in the air near the airport, generally 2 to 5 nautical miles (3.7 to 9.2 km) depending on the airport particulars.

Sometimes, the aircraft will be landed through the autopilot means, such an autopilot can operate independently, controlling heading and altitude, or it can be coupled to a navigation system and fly a programmed course or an approach with glideslope. Modern autopilots use computer software to control the aircraft. The system obtains the aircraft's current position to guide the aircraft.

Once the aircraft has landed, the tower controller directs it to an exit taxiway and passes the plane off to the ground controller, who then hghdkp0kkk directs the plane to the appropriate terminal gate.

Airway routing occurs along pre-defined three dimensional flight paths, in most cases between the departure and destination airports. Most airways are eight nautical miles (14 kilometers) wide, and the airway flight levels keep aircraft separated by at least 1000 vertical feet from aircraft on the flight level above and below.

In 1964, the FAA instituted two layers of airways, one from 1,000 to 18,000 feet (305 to 5,486 meters) above ground level and the second from 18,000 to 45,000 feet (13,716 m) above mean sea level. FAA landing regulations additionally require an altitude of 1,000 feet above the highest obstacle in congested areas (500 feet in other areas) within a horizontal radius of 2,000 feet of the aircraft. The landing speed is predetermined for different categories of the aircrafts when the most commercial airplanes belong to category D (between 141 knots and 165 knots).

There is a minimum distance from the landing threshold:
(a) Category I aircraft safety landing behind Category I or II—3,000 feet.
(b) Category II aircraft landing behind Category I or II—4,500 feet.
(c) When either is a category III aircraft—6,000 feet.

Upon FAA Order 7110.65W, Chapter 3 mainly, but I'll try to keep it short), most departures from the same runway use distance for separation. The standard is the lead aircraft is clear of the runway, but most of the time can be shorter under most circumstances. The only times it becomes time based, if it's wake turbulence related, or various conditions of non-radar separation needing to be applied.

Additionally, under some circumstances, there are different wake-turbulence departure criteria. For example, on same or parallel runways separated less than 2500 feet: small/large/heavy aircraft behind heavy aircraft—the separation criteria is 2 minutes (same direction), for small/large/heavy aircraft behind heavy aircraft the separation criteria is 3 minutes (opposite direction or intersection departure). On the same runway, small aircraft behind large—3 minutes (opposite direction or intersection departure), and in the intersecting runways criteria: small/large/heavy aircraft behind heavy aircraft the separation criteria equals to 2 minutes.

In a standard airport landing pattern, aircraft turn from base leg to final within one-half to two miles of the airport and circuits are, by convention, flown at 1,000 feet above circuit altitude. 800 feet is common in many airports as well.

Our systems will use all of the data gathered from all the aircraft to produce the optimal 4D trajectory for the aircraft for the landing and the takeoff stages.

Using our system, due to eliminating the "go-arounds" and maximizing the runway throughput—an overall airport capacity is raised, workload on tower controllers is reduced, airlines' fuel consumption and operating costs are reduced and, therefore the pollution is reduced also. At maximum capacity, our system can generate at least 20 landings and takeoffs per hour under existing safety distance regulations which may reduce or eliminate the need and the high cost of building a new runways for airports working at or near the maximal capacity. For example, Europe's largest airport—Heathrow in London, handling 75 million passengers in 2015 operates at 98% of its capacity. The UK Airports Commission estimates that the cost of a new Heathrow runway would be £13-£18 billion, while a new Gatwick runway at £10-£13 billion.

Recent Advances

Recently, there have been a number of significant advances in air traffic control industry.

The Wide Area Augmentation System (WAAS), provides the ability to accurately determine coordinates of the airport to assist in automatic landing procedure. Before WAAS, the U.S. National Airspace System did not have the potential to provide horizontal and vertical navigation for approach operations for all users at all locations. The WAAS will allow GPS to be used as a primary means of navigation from takeoff through Category I precision approach. The WAAS broadcast message improves GPS signal accuracy from 100 meters to approximately 7 meters. https://faa.gov/about/office_org/headquarters_offices/ato/service_units/techops/navservices/gnss/waas/

A flight management system (FMS) is a computer system that automates a wide variety of inflight tasks. By using sensors, such as GPS and INS, it determines the aircraft's position and guides the aircraft along the flight path. The FMS can be used for determination of 4D flight path with Vertical Navigation (VNAV) system. An example of such system is the one produced by the French-Italian company ATR.

An instrument landing system (ILS) is a ground-based instrument approach system that provides precision lateral and vertical guidance to an aircraft approaching and landing on a runway to enable a safe landing during instrument meteorological conditions.

The most advanced currently available airport tower systems are:

Next Generation Air Transportation System (NextGen) is a new National Airspace System due for implementation across the United States between 2016 and 2025. The NextGen proposes to transform air traffic control system in USA from an old ground-based system to a satellite-based system. The main element of the NextGen system is an Automatic Dependent Surveillance-Broadcast system (ADS-B). ADS-B uses GPS signals to provide air traffic controllers and pilots with information that will help to keep aircraft safely separated in the sky and on runways. Through ADS-B In system, a pilot is getting location and traffic information on surrounding aircraft.

Raytheon presented Starts system that will be a part of NextGen, which is as a command-and-control system that integrates aircraft surveillance and flight-plan data and presents the information to TRACON controllers on high-resolution, 20- by 20-inch color displays. Stars system does not provide an optimized trajectory, but rather displays the location of the aircrafts.

Single European Sky ATM Research (SESAR) includes the 4D Trajectory Management solution creates a situation where the flight can be managed to obtain the airspace user's ideal profile, to optimize the flow of air traffic.

The Saab Remote Tower product suite includes High Definition cameras and Pan-Tilt-Zoom cameras, surveillance and meteorological sensors, microphones, signal light guns and other devices for deployment at the airport. Data from these sensors are sent to a Remote Tower Center (RTC) to be displayed in real time. A controller at the RTC has the tools, in addition to live video, to operate the airport in a similar manner as he or she would in a traditional Air Traffic Control Tower.

Another Swedish company, LVF, by deploying Remote Tower Services (RTS), can operate a number of air traffic control towers from a distance. By the end of October 2014 LFV got the operational approval for RTS from the RTC in Sundsvall, serving Örnsköldsvik airport over 150 km away, starting April 2015.

Boeing presented InFlight Optimization Services solution to identify real-time fuel-saving opportunities as it continuously scans real-time flight operations and delivers flight-specific advisories that result in time and fuel improvements.

There are a number of patent applications in the airport descent/ascent area. None of them present optimal landings/takeoffs system with trajectory presented. A number of patents and/or articles further presented disclose "cruise" flight stage trajectory determination and optimization.

US 20090157288 by Bailey introduces systems and methods for implementing a time factor in the flight of an aircraft corresponding to an airspace delay or acceleration. A flight management computer or other computational device of the aircraft calculates a proposed change in trajectory in order to accommodate the time factor in an optimum or nearly optimum manner. An operator-selected change in trajectory is then implemented in order to accommodate a new arrival time of the aircraft at its destination or a positional point.

US 20150269846 by De Prince discloses a system and method for generating arrival traffic schedules incorporating equipage-dependent in-trail spacing (time or distance). An arrival management system has a ground-based scheduling tool that applies customized spacing buffers between in-trail aircraft depending on the types of FMS equipage onboard aircraft sequence pairs.

US 20130184978 by Subbu titled: "Schedule management system and method for managing air traffic" discloses a system and method to improve efficiency in aircraft maneuvers to accommodate time-related constraints in air traffic. Information related to flight performance and atmospheric conditions is gathered onboard an aircraft, then transmitted to an air traffic control center. In the event of a delay or any other event which necessitates an alteration in an aircraft trajectory, the data is sent to a decision support tool to compute and provide alternative trajectories, preferably including operator-preferred trajectories, within air traffic constraints. Air traffic controllers can then offer an alternative trajectory to an aircraft that is more efficient, cost effective, and/or preferable to the aircraft operator. Unlike our invention, Subbu does not present automatic trajectories determination, and the trajectories in Subbu regard to the whole flight, and not specific to landing, as in our patent application.

US 20120116614 by Torres titled: "Method and apparatus for air traffic trajectory synchronization" discloses an apparatus and method to synchronize the distinct trajectories predicted by a flight management system and air navigation service provider. A comparison model is generated that indicates differences between an aircraft trajectory and a ground trajectory. A modified ground trajectory is produced that incorporates the designated change to the flight plan trajectory, until the discrepancies of the trajectory become insignificant.

U.S. Pat. No. 6,604,044 by Kirk discloses a method for generating conflict resolutions for air traffic control of free flight operations, comprising the steps of: examining continuous space enveloping said subject aircraft for potential aircraft problems for a predetermined look-ahead time interval defining a plurality of examination passes and generating resolutions in response to problems encountered in said examined continuous space, each resolution proposing a predefined type of maneuver for said subject aircraft and calculating parameters of requested maneuvers.

U.S. Pat. No. 7,650,232 by Paielli titled "Trajectory specification for high capacity air traffic control" describes method and system for analyzing and processing information on one or more aircraft flight paths, using a four-dimensional coordinate system, when errors are estimated and compared with a permitted error bounding space surrounding the reference flight path. Unlike our disclosed invention, the U.S. Pat. No. 7,650,232 patent does not disclose the landing/takeoff trajectory determination. It rather solves a problem of securing a safe distance from one airplane to another during the entire flight, and especially it deals with securing such safety distance in case of modifications in the pre-determined flight path (i.e., in a case of flight delays, etc.).

U.S. Pat. No. 8,417,396 by Goodman discloses a method of operating air traffic control system, wherein an airplane receives clearances and other instructions from a control system via a data link and displaying the received information and provides the instruction to an airplane via a data link between the control system and a system of the airplane and rendering, on a display device of the airplane, the information representative of the instruction, such as a time or a distance separating the airplane from the other airplane.

U.S. Pat. No. 9,536,435 by Shay presents a method and device for optimizing the total energy state of the aircrafts. Conflict avoidance procedure is presented wherein the system creates safety waypoints, the electronic device measures the safety distances, and the pilot of the aircraft can select a conflict-free trajectory and a traffic avoidance waypoint from the plurality of traffic avoidance waypoints to optimize a total energy state of the aircraft.

U.S. Pat. No. 7,877,197 by Lewis discloses the system that analyzes air traffic based on a plurality of inputs, to produce at least one conflict-checked, operationally preferred flight trajectory revision opportunity, and a communications component configured to communicate the at least one conflict-checked flight trajectory revision. No 4D landing trajectory determination and optimization has been disclosed by Lewis.

U.S. Pat. No. 8,401,773 by Eagles discloses an air traffic control system for controlling a plurality of aircraft held vertically separated in a stack above a minimum stack level, such a system periodically receives an aircraft flight level and arranges a plurality of an aircrafts in a vertical list ranked by flight level.

WO2007072015 by Janes provide computerized support system for air traffic control which allow human operators to increase the airport capacity through using advanced radar, radio and meteorogical data as assistance tools to the operator. No computerize-generated nor optimized trajectory is presented.

U.S. Pat. No. 8,942,914 by Subbu presented a method for managing air traffic that includes assigning the scheduled time-of-arrival (STA) as a required time-of-arrival (RTA) for the first aircraft at the metering fix point, transmitting the RTA to the first aircraft; and using an automated flight management system of the first aircraft to modify the speed of the first aircraft to achieve the RTA of the first aircraft at the metering fix point. The invention further includes giving instructions to the aircrafts to adjust the speed to fly at best fuel-effective speed. No landing trajectories optimization presented there.

U.S. Pat. No. 8,965,672 by Sawhill titled: "System and method for planning, disruption management, and optimization of networked, scheduled or on-demand air transport fleet trajectory operations" discloses a system for analyzing and managing the airspace, including managing a number of multidimensional aircraft trajectories for the purpose of maintaining or increasing system safety, and to identify possible phase transition structures to predict when an airspace will approach the limits of its capacity. The U.S. Pat. No. 8,965,672 patent, unlike our application, does deal with trajectory of the whole flight and does not deal specifically with the optimization of landing trajectory.

US 20130317731 by Scott presents a method of achieving an optimized air traffic control, comprising: acquiring data relative to the air traffic control system-state, including information from air traffic control objects, data from environmental sensors and measurement devices; associating a risk confine around each air traffic control object, and assigning the ranked and sorted solution sets to air traffic control objects within the system, and offering a choice of solution sets to the air traffic control object under safety and efficiency thresholds.

In US Patent Application 20130013182 by Bertsimas "Airport Operations Optimization" described are computer-based methods and apparatuses, including computer program products, for airport operations optimization. In some examples, a method for airport operations optimization includes generating a runway configuration for a time period based on runway information. The method further includes generating a flight-to-runway assignment for the first time period based on flight information, and generating a sequence of flights for the time period based on the runway configuration, the flight-to-runway assignment, and the flight information.

US 20090012660 by Roberts titled "Air Traffic Control" discloses an air traffic control system, for use by a controller controlling multiple aircraft, to predict and calculate a trajectory for each aircraft, and for detecting, based on the trajectories, future circumstances under which pairs of aircraft violate predetermined proximity tests, and for causing a display on the display device indicating said circumstances. Unlike in our application, no optimal trajectory determination for landings or takeoffs presented by Roberts.

US 20050035898 by Shiomi titled "Method for displaying position of an aircraft in a display for air traffic control provided a method for displaying aircraft positions" is a method of avoiding the occurrence of near miss or collision, through displaying the terrain of an air space under air traffic control apparently in three dimensions on a display screen, displaying aircraft marks at positions on the display screen so as to correspond to the three-dimensional positions of the respective aircraft, and displays a warning mark when a distance between two aircraft is shorter than a threshold value.

An article titled: "Automated ATM System for 4-Dimensional Trajectory Based Operations" describes a system for determining landing objectives, but, unlike in our patent application, the landing trajectory is not determined there.

Another article titled: "A Real-time Schedule Method for Aircraft Landing Scheduling Problem Based on Cellular Automaton" proposes method for aircraft landing scheduling but, unlike our system, no trajectory determination is offered there as well.

"Models for Aircraft Landing Optimization" article also proposes method for aircraft landing scheduling but, unlike our system, no trajectory determination is offered there as well.

In article titled: "Design Principles and Algorithms for Automated Air Traffic Management" by Heinz Erzberger the First-Come-First-Serve landing algorithm is described to accommodate position-shifted sequence order at the runway or the meter gates for reducing delays by optimizing the landing taking in consideration various security separation constrains. The algorithm described in this article does not provide optimal landing trajectories, but rather provides an explanation that in case of position-shifted sequence order, the aircraft should accommodate for the delay using fuel savings information written in the manual. http://aviationsystemsdivision.arc.nasa.gov/publications/more/ctas/erzberger_11_95.pdf An article titled "An Agent-based Approach to Automated Merge 4D Arrival Trajectories in Busy Terminal Maneuvering Area" provides 4D trajectories for airplanes arriving to landing when they merge in a certain point before they enter the airfield airspace.

An article titled "Investigation, Modeling, and Analysis of Integrated Metroplex Arrival and Departure Coordination Concepts" discloses the Order of Consideration algorithm that ensures that aircraft within a single stream-class are sequenced to the runway in the same order as the order in which they are predicted to cross the arrival fix. Unlike in our invention, no optimal landing trajectory is determined in the article.

"Flight trajectory optimization for an efficient air transportation system" by Navinda Kithmal Wickramasinghe. The article provides 4D trajectory optimization for the flight but not for the landing/takeoff phase http://icas.org/ICAS_ARCHIVE/ICAS2012/PAPERS/910.PDF An article titled "Three-Dimensional flight experiments using on-line mixed-integer linear programming trajectory optimization" by Culligan presents path planner formulation for unmanned aerial vehicles in such a way that obstacles can be avoided.

A thesis by Ryan Howe-Veenstra "Commercial Aircraft Trajectory Optimization and Efficiency of Air Traffic Control Procedures" provides 4-D trajectory optimization for the flight but not for the landing/takeoff phase of flight. https://conservancy.umn.edu/bitstream/handle/11299/119038/Howe-Veenstra_Ryan_November2011.pdf?sequence=1

"Optimizing Aircraft Trajectories with Multiple Cruise Altitudes in the Presence of Winds" Hok K. Ng, University of California, Santa Cruz, Moffett Field, Calif. 94035, Banavar Sridhar and Shon Grabbe, NASA Ames Research Center, Moffett Field, Calif. 94035

This study developed a trajectory optimization algorithm that minimizes the cost of time and fuel burn by integrating a method for computing minimum-time routes in winds on multiple horizontal planes and an aircraft fuel burn model for generating fuel-optimal vertical profiles. It is applied to evaluate the potential benefits of flying wind-optimal routes in a seamless airspace http://aviationsystemsdivision.arc.nasa.gov/publications/2014/JAIS_Ng_2014_01_Preprint.pdf "Aircraft Rescheduling with Cruise Speed Control" by M. Selim Aktürk discloses the implementation of a conic quadratic optimization approach to solve a critical aircraft recovery problem in an optimal manner. A natural extension of this study would be developing a robust airline schedule so that the disruptions can be managed in a less costly manner http://ieor.berkeley.edu/~atamturk/pubs/_published/or62-2014.pdf An article named: "Convex Formulations of Air Traffic Flow Optimization Problems" by Daniel Work discloses a new technique for modeling changes in overall traffic flow that increases the feasibility of maximizing aircraft arrivals and minimizing delays. No trajectory determination proposed there. https://researchgate.net/publication/224369534_Convex_Formulations_of_Air_Traffic_Flow_Optimization_Problems Another article named: "Landing Safety Analysis of An Independent Arrival Runway" by Xie performs safety analysis of landing intervals. No trajectory determination proposed there. http://catsr.ite.gmu.edu/pubs/2004_ICRAT.pdf Another article titled "A soft dynamic programming approach for on-line aircraft 4D-trajectory optimization" by Patrick Hagelauer, Felix Mora-Camino provides an attempt on the cruise stage flight trajectory optimization. Again, no landing optimization is disclosed there. https://hal-enac.archives-ouvertes.fr/hal-01021633/document Yet another article named "Mixed Integer Second-Order Cone Programming for the Horizontal and Vertical Free-flight Planning Problem" also provides programming approach for on-line aircraft 4D-trajectory optimization" by Zhi Yuana et al provides an attempt on the cruise stage flight trajectory optimization. Again, no landing optimization is disclosed there. https://optimization-online.org/DB_FILE/2015/08/5049.pdf "Mathematical Models for Aircraft Trajectory Design: A Survey" by Daniel Delahaye provides Emergency Aircraft Trajectory Design and minimal fuel consumption trajectory design for the aircraft. https://hal-enac.archives-ouvertes.fr/hal-00913243/document "Commercial Aircraft Trajectory Optimization and Efficiency of Air Traffic Control Procedures" by Howe-Veenstra provides the aircraft trajectory for the cruise phase of the flight, but the landing approach is not modeled there, starting from the final runway approach. https://conservancy.umn.edu/bitstream/handle/11299/119038/Howe-Veenstra_Ryan_November2011.pdf?sequence=1

Yokoyama in his article titled "Flight Trajectory Optimization Using Genetic Algorithm Combined with Gradient Method" provides numerical method to solve trajectory optimization problems where efficient flight trajectories are searched to minimize a performance index with specified constrained. No landing phase optimization is provided. http://item.woiz.polsl.pl/issue/pdf/FlightTrajectoryOptimizationUsingGeneticAlgorithmCombined.pdf Bakolas in his "Initial Guess Generation for Aircraft Landing Trajectory Optimization" presents a model to generate a geometric path which connects the initial and terminal configurations of the aircraft satisfying the following requirements with the projection of the three-dimensional curve onto the horizontal plane corresponds to a Dubins-like path, that is, a composite path that solves the Markov-Dubins problem; and an aircraft traveling along this path is continuously descending until it reaches its final destination.

http://dcsl.gatech.edu/papers/aiaa11.pdf

None of the abovementioned prior art patents, patent applications and articles present optimal landings/takeoffs system with optimally and individually determined trajectory.

BRIEF DESCRIPTION OF THE DRAWINGS

FIG. 1a presents a general overview of the system;

FIG. 1b presents the arcs locations with landing trajectory points illustration;

FIG. 2 provides graphical illustration of the landings and takeoffs data flow in the disclosed system;

FIGS. 3a and 3b provide graphical overview of the optimal trajectory determination process in the invented system;

FIG. 4 shows four stages of landing;

FIG. 5a provides graphical illustration of different airports runways scenarios;

FIG. 5b provides graphical illustration of different airports runways scenarios;

FIG. 6 shows a graphical illustration of traffic lights system.

DETAILED DESCRIPTION OF THE INVENTION

In the following discussion, numerous specific details are set forth to provide a thorough understanding of the present invention.

Other features and advantages of the present invention will be apparent from the following description taken in conjunction with the accompanying drawings, in which like reference characters designate the same or similar parts throughout the figures thereof.

The ultimate goal of the invented system is to maximize airport' capacity while removing, or minimizing reliance on air traffic controllers in maintenance of separation between aircrafts on the landing/takeoff stage. Accordingly, the system can be implemented as either automatic, eliminating the need in the air traffic controllers, or decision-support system, facilitating more efficient work of human-managed air traffic control tower. System working parameters can be modified in a real-time mode, thus giving the air traffic controllers the flexibility to manage the system.

The system is designed in such a way that it can work, under safety standards and regulations, for all airports for a variety of runway' lengths, separation intervals and distances, final approach point lengths and heights, initial and final approach speeds, slopes, safety time intervals between landing and/or takeoff, takeoff duration, etc.

The optimized landing in our invention is based on queuing landing/taking-off aircrafts by building a virtual arc-shaped line near the airport, and "catching" every aircraft at some certain point on this virtual arc near the airport, a plurality of points, we call those points: "identification arc", and by building individually-located "starting points arc" built in such a way so to satisfy queue constrains.

Takeoffs schedule queue is taking in consideration when scheduling landings while complying with security requirements. Takeoffs will be scheduled in such a way that they will leave immediately one after another taking in consideration security separation requirements. Landings and takeoffs can be performed on one or several runways.

The invention, thus, includes an air traffic control landing/takeoff optimization system for determining a four dimensional (4D) trajectory for efficient landing/takeoff sequence and time schedule for a given set of aircrafts, wherein each air traffic control object includes a transmitter and receiver for bi-directional communications. The data sending can be performed using both data "push" and data "pull" technologies.

Safety data and separation data in particular, will be the major input for the system. In contrast to the prior art systems, where static separations of fixed lateral and horizontal distances between objects are required, the present invention allows for dynamic real-time separation. As such, the aircraft multilateral air traffic control security separation is based on four main principles, as the system makes continuous determinations for each pairing of aircrafts within the system, and for all pairings of aircrafts as a whole:

1. On system set-up in the airport, the user will check and adjust airport specific landing parameters. If there is a collision probability, the user can adjust the parameters until no collision probability is expected. Such checks will also be performed on the real-time basis, performing preliminary checks considering a number of landings/takeoffs estimated per specific day.
2. After the individual aircraft trajectory has been computed, the system checks if there is a safe passage throughout the proposed trajectory without collision danger. If there is a potential collision danger, then the trajectory will be modified, and the system will check if, and until, the new trajectory is collision-free.
3. Then, throughout the duration of landing, the system constantly checks if there is any new collision danger. If there is a new collision danger, the trajectory will be modified, and the system will check if, and until, the new trajectory is collision-free.
4. Additionally, landing traffic lights system will be further provided, such a system having changing colors depending on the availability status of the runway, wherein the color will be red, and when the aircraft will leave the runway area, the sensors will be activated and the light will be turned to the green.

As graphically described in FIG. 1a, the centralized processing server unit (101) will be established for each airport' air traffic control unit. On system set-up in the airport, the user will check and adjust airport specific landing parameters. If there is a collision probability, the user can adjust the parameters until no collision probability is expected. Such checks will also be performed on the real-time basis, performing preliminary checks considering a number of landings/takeoffs estimated per specific day.

The said server, receiving and storing, a schedules data on landings and takeoffs from the said airport. Further, the said server is receiving and storing current real-time and interactive location data and flight path data (102) from all airplanes scheduled to land and takeoff at the said airport; receives and stores flight safety regulations data; wherein at the said server the landing and takeoffs optimization is performed considering the safety regulations criteria (103), according to the steps that will be detailed below.

The system works under a number of constrains, to comply with the strict FAA regulations. Each runway can be used by at most one aircraft at a time with an existing minimal distance landing threshold, airport landing patterns and landing circuits. The system works per runway but can be copied in a case of multi-runway airports.

Individual airport data (104) will be further included, i.e., includes characteristics such as runways data, wind, noise restrictions that must be enforced and inputted as constrains into the model, physical and other obstacles in the proximity of the airport, etc. The data is interactive. Additional data will include runway coordinates (longitude and latitude for the landing touchdown point, and longitude and latitude for the runway finish point), runway heading angle and runway length, so the final approach points and coordinates would be computed according to that data. Almost all runways are bidirectional, and aircraft use whichever runway in whichever direction is best suited to the wind. In light and variable wind conditions, the direction of the runway in use might change several times during the day. There are one runway airports and multi-runway airports, when most large airports have 2+ runways.

Industry regulator (i.e., FAA) requirements will be further added as an input for the system (105).

Input data from the further described Landing Traffic Lights System will be additionally added (106).

The optimal landing schedule will be created and optimal trajectories for all aircrafts will be generated according to the 4-stages optimization model within the acceptable solutions sets, achieving an optimization of both safety and efficiency in the system-state. The optimal trajectory will be sent to the aircrafts (107) after entering the identification arc location and getting to the second arc line location, called "starting points" line.

The two above mentioned arc locations are graphically presented in FIG. 1b (larger and smaller arcs, correspondingly). FIG. 1b also illustrates landing trajectory points of 34 landing aircrafts x1 . . . x34.

Such optimal trajectory will be based also on:
initial aircraft speed ($V_I^{Low} \leq V_I^i \leq V_I^{Up}$) with an increment of $\delta_I^V > 0$, meaning that that initial speed $V_I^i$ of the aircraft i belongs to the interval $[V_I^{Low}, V_I^{Up}]$ and $V_I^i \in \{V_I^{Low} + k\delta_I^V,$ $k=0,1,\ldots(V_I^{Up}-V_I^{Low})/\delta_I^V\}$ with final speeds at final approach $(V_F^{Low} \leq V_F^i \leq V_F^{Up})$ with increment of increment $\delta_F^V$;

initial heights $(H_I^{Low} \leq H_I^i \leq H_I^{Up})$ with an increment of $\delta_I^H$; landing slopes $(K_S=\{S^i \in [S^{Low}, S^{Up}]\})$ with an increment of $\delta^S$;

total duration from aircraft identification to the final approach: $(\tau_I^{Low} \leq \tau_I^i \leq \tau_I^{Up})$ with an increment of $\delta_I^\tau$;

minimal time between landings/takeoffs for different aircraft types.

Furthermore, alert is provided to the pilots and to the airport' air traffic control if deviation from trajectory is detected. Then, the system generates a new trajectory taking in consideration all current security constrains.

FIG. 2 provides graphical overview of the dataflow and communication in the invented system. All dataflow will be centered on the centralized processing server unit (201).

Aircrafts scheduled for the takeoffs send to the central processing server unit their position and, after processing, receive back takeoff time with their takeoff trajectory remains constant as per without invented system (202), while landing aircrafts (203) sends their location to the central processing server unit and receive optimal landing trajectory.

The primary technology used by our system to receive flight information is called automatic dependent surveillance-broadcast (ADS-B). ADS-B uses GPS signals to provide information to keep aircraft safely separated, and it provides air traffic controllers with real-time position information. Currently, almost 99% of aircrafts in Europe are covered with ADS-B receivers, and there is also a significant ADS-B coverage in USA and worldwide. ADS-B will become mandatory for most aircraft around the world by year 2020. ADS-B consists of two different services: "ADS-B Out" and "ADS-B In". "ADS-B Out" provides information about each aircraft, such as identification, current position, altitude, and velocity. The ADS-B transmits signal containing the aircraft location. ADS-B signal is picked up by a receiver connected to our system. Another technology which can be used by our system is the Wide Area Augmentation System (WAAS) that provides the ability to accurately determine coordinates of the airport to assist in automatic landing procedure, as it improves GPS signal accuracy from 100 meters to around 7 meters.

Optimal Landing Trajectories and Scheduling Model

FIGS. 3a, 3b and 3c provide graphical overview of the optimal trajectory determination process in the invented system, to achieve airport maximal capacity, i.e., maximal "number of safe landings per certain time period".

The main goals of the model are the following:
1. Maximum aircraft landings/takeoffs for runway based on the real-time data;
2. Shortest/fastest landing 4D trajectory based on the real-time data.

Based on the goals above, the model for calculating trajectories for the descent is described below (from the start of descent point to the final landing point).

The optimization scheduling model takes into account, for the aircraft separation difference, a starting point of landings when two consecutive landing will be performed, but if the next scheduled aircraft will be a taking-off aircraft, then a different separation difference considered—will be between the finish points of the previously landing/taking-off aircraft (finish of landing/finish of the takeoff) and the starting point of the next aircraft taking-off. For the aircraft separation difference between takeoff and following landing, the finish of landing is considered as a start of separation differences between the two aircrafts. Different configurations of starts/finishes could be valid in different embodiments of the invention.

To start with, we determine the minimal distance of the landing aircraft from the final approach point (initial landing location) by: $D_M^i$ A specific $D_M^i$ depends on the kind of airport and also on the aircraft type.

By default, we define $D_M^i$ as a function time with the default being 40 minutes until landing so $D_M^i \approx 300\text{-}400$ km, if average speed for entire landing is 500-600 km/h.

Initial angle of location of the aircraft i-th is defined by $\alpha_0^i$.

Initial vertical flight level of the landing aircraft is defined by $H_0^i$.

Then the location $P_0^i$ ($x_0^i$, $y_0^i$, $z_0^i$) is represented by:

$$P_0^i=(D_M^i \cos \alpha_0^i, D_M^i \sin \alpha_0^i, H_0^i).$$

Initial aircraft speed value before start of landing will be further defined by $V_0^i$.

$(X_{FA}, Y_{FA}, Z_{FA})=(0, 0, 0)$ as we decided to start the system of coordinates in our model at that point.

Maximal and minimal final speeds at final approach are defined by:

$V_{fMax}^i, V_{fMin}^i$ (such maximal and minimal final speeds depend on the airport and on the kind of aircraft).

Direction of $V_f^i$ is in the direction of the runway (parallel to X axis).

Maximal allowed slope of trajectory is: $S_M^i$ (maximal 6%).

$\tau^i$ defines time required for landing of the aircraft i-th in order to meet arrivals' schedule.

$\sigma$ defines safe distance (in 3 dimensions, in a parallelepiped-like shape) between landing aircrafts.

The model will produce the following output data:
1. Point of landing $P_L^i$ and distance from initial landing location to the landing starting point:
distance $(P_0^i, P_L^i)=d_4^i$;
2. Constant slope:
$S_C^i \leq S_M^i$ to meet required duration of the landing arrival schedule;
3. Corrected Final speed:
$V_{FMin}^i \leq V_{Fc}^i \leq V_{FMax}^i$ used in case when correction of the slope is not sufficient to meet the landing arrival schedule.

The disclosed system can be implemented for each runway in three different work modes:
1) Landings & takeoffs mode; 2) landings only mode; and 3) takeoffs only mode.

To determine maximal runway capacity for the runway shared for landings and takeoffs:

$$C_{L\&T}=[60/t_{L-L}]+[(t_{L-L}-d_{L-T})/(t_{T-T}+d_T)]\cdot[60/t_{L-L}-1]$$

where: $C_{L\&T}$—capacity per hour of the runway shared for landings and takeoffs (subject to safety regulatory constrains); $t_{L-T}$ minimal time interval for takeoff before next landing.

To determine maximal runway capacity for the runway dedicated for landings only:

$$C_L=60/t_{L-L}$$

where: $t_{L-L}$ time interval between landings, $C_L$—runway capacity per hour (subject to safety regulatory constraints).

To determine maximal runway capacity for the runway dedicated for takeoffs only:

$$C_T=60/(t_{T-T}+d_T)$$

where: $t_{T-T}$ time interval between takeoffs, $d_T$ takeoff duration, $C_T$ runway capacity per hour (subject to safety regulatory constrains).

In case where the takeoffs are involved, a special aerial sector for takeoffs will be determined: ($\gamma^{Min} \leq \gamma_i \leq \gamma^{Max}$); as well as sector for landings (301). Such a sector for landings should have an angle equal to rotation percentage increment $\delta^\gamma$. The above sectors will be determined in such a way that that there is a safety interval between them to comply with standard industry security regulations.

In different modes, the system will include the following user-defined parameters for aircrafts:

Minimal time period between takeoff to takeoff; minimal time period between takeoff and landing; minimal time period between landing and takeoff; minimal time period between two landings; flying minimal time interval in vicinity of runway.

Landing aircrafts have priority over takeoffs, so aircraft waiting for the takeoff is waiting for the "green" signal. Such aircraft will be allowed to takeoff if time remaining to the next landing is larger than predetermined minimal time period and if the time past after previous takeoff is larger than the minimal waiting time for waiting for the takeoff.

The optimized landing in our invention is based on building a virtual arc-shaped line near the airport (an "identification arc"), and "catching" every aircraft at some certain point on this identification arc near the airport, we call this point: "identification point". Thus, a plurality of identification points creates an identification arc.

Firstly, parameters for the identification arc will be determined on the central processing server unit (302). Such parameters will include height, speed, aircraft type, and other relevant information.

An identification arc will be determined individually for each airport based on individual airport-pertaining particulars data. This line will be common for all aircrafts landing in the specific airport.

Next, number of identification line arc-shaped curve boundary vertices will be determined (303)

The boundary of new aircrafts identification points consists from start points of trajectories with maximal height, maximal speed, minimal slope, that are different each from other by values of triangle rotation percent ($\gamma^{Low} \leq \gamma^i \leq \gamma^{Up}$), where rotation percentage $\gamma^{Low} \leq \gamma^i \leq \gamma^{Up}$ has an increment of $\delta^\gamma$.

This curve is spanned on $N_\gamma = (\gamma^{Up} - \gamma^{Low})/\delta^\gamma + 1$ vertices, These vertices are $N_\gamma$ start points of trajectories ordered from $\gamma^{Low}$ to $\gamma^{Up}$.

On the next stage, the system will search for and identify landing aircrafts near the identification arc area (304).

Next, the system will check if the distance from the aircraft current location to the nearest vertex in the identification arc is less than the certain predetermined tolerance level (305).

Next, we choose two trajectories from $N_i^\gamma$ trajectories with trajectories first points $P_{1L}^i$ and $P_{2L}^i$, such points are the nearest to $P_0^i$ (from different sides of $P_0^i$) with $\gamma_1^i, \gamma_2^i$.

Now, we check if the distance/s from $P_0^i$ to $P_{1L}^i$ or/and from $P_0^i$ to $P_{2L}^i$ is/are more than predefined tolerance $\theta_i$ (such tolerance depends on an aircraft type), compute new virtual trajectory with same parameters, but with $\gamma_0^i = (\gamma_1^i + \gamma_2^i)/2$ and check if the last point of this new trajectory is nearer to initial location $P_0^i$ than tolerance $\theta_i$. If yes, then this $\gamma_0^i$ is considered as proper, else for new pair of trajectories accepted: the new trajectory and that of two previous that is from opposite side of the plane i-th. This is repeated until the less-than-tolerance $\theta_i$ condition will be satisfied.

Now, we calculate time duration of flying between the identification line and the starting points line: interval $\tau_4^i$ is required to move from $P_0^i$ on identification line to $P_L^i$ on the starting points line; the distance $D_{0L}^i$ should be along the arc including 3 points—$P_0^i$ and first and second points of computed trajectory: $\tau_4^i = R_4^i \varphi_4^i / V_L^i$;

Where $R_4^i$ is the radius of the arc;

$\varphi_4^i$ is the angle based on part of this arc between initial location $P_0^i$ and the first point of the nearest trajectory.

For each airport, as detailed above, a number of unique input parameters will be considered, such as runway/s coordinates (latitude and longitude), runway/s heading angle, runway/s length, etc.

When the distance from nearest aircraft to the nearest (to this aircraft) identification arc point is less than predefined tolerance value (e.g. 1 km) then this aircraft is marked as identified and his input data is stored by the system. Such data includes: aircraft initial location $P_c$; and initial speed.

If it is, then aircraft location, time, speed data is collected (306), if it is not, then the new aircraft data is checked, and the distance is checked relative to the tolerance until it is less then the permitted tolerance level.

When new aircraft sends its data to the central server, the proper trajectories starting points' line for the current aircraft will be calculated (307) and stored until landing. This curved line parameters are individual for each landing aircraft (while identification line parameters and location are the same for all landing aircrafts for the certain airport/runway), and we call this second identification line the "starting points line". The starting points' arc-shaped line is determined in such a way that landing time duration from that arc until the end of landing will be identical for all landing aircrafts. This curved line is spanned also on $N_\gamma$ vertices. These vertices are starting points of trajectories ordered from $\gamma^{Low}$ to $\gamma^{Up}$. However these trajectories have the same duration $\tau^i$.

If two aircrafts will arrive in the same time to the identification line, the starting points' lines for those particular aircrafts will be calculated in such a way that they will arrive to the starting points' line with the certain time difference larger than the predetermined safety time interval. To facilitate that, the trajectory on the segment between the identification line and starting points' line will be further calculated, wherein the aircraft will fly with constant speed and vertical position, while taking into consideration safety regulations and regulatory distances and intervals.

Let's now denote Safe-Time-Interval between two landing aircrafts by $S_T$.

Let's now denote time difference between the current aircraft number i-th arrival to the identification line and the previous aircraft's arrival to that line by $\Delta\theta_B^i$.

If $\Delta\theta_B^i > S_T$ then no adjustment needed to be done, otherwise, for the current aircraft, the certain location on the starting points line $L_R^i$ should be found with duration $\tau_5^i$ (from identification line to starting points line). $L_R^i$ will be selected from plurality of points on the starting point line in such a way that $\Delta\theta_B^i + \tau_5^i - \tau_5^{i-1} \geq S_T$ will be meet. $L_R^i$ should be selected in such a way that it will reflect a closest $\tau_5^i$ possible.

To assure safe aircrafts passage between the above two lines, the aircrafts should arrive to the starting points line on the same side of the runway axis as they were on the identification line (Y>0, if Y>0 on the identification line).

$|\gamma_R^i| \geq |\gamma_B^i|$, so the triangle rotation percent of the location on the starting points line should be bigger (in absolute value) than triangle rotation percent of the location on identification line.

On the next stage, landing slope percentage for the aircraft at current speed will be calculated (308). First, the landing slope is defined by $S_3^i \in K_S$ and it is calculated according to the maximal/minimal allowable speeds at the identification point $V_I^{Up}, V_I^{Low}$, as well as upper/lower allowable slopes limits for landing $S^{Up}, S^{Low}$.

Slope is a rational function of these parameters, and also of the identified speed of current landing plane. This function for minimal initial speed should give maximal slope and vice-versa: for maximal initial speed should give minimal slope $$S_3^i = \frac{S^{Up} - S^{Low}}{V_I^{Low} - V_I^{Up}} V_I^i + \frac{S^{Low} V_I^{Low} - S^{Up} V_I^{Up}}{V_I^{Low} - V_I^{Up}};$$

e.g. $V_I^i = V_I^{Low}$ $$S_3^i = \frac{S^{Up} - S^{Low}}{V_I^{Low} - V_I^{Up}} V_I^{Low} + \frac{S^{Low} V_I^{Low} - S^{Up} V_I^{Up}}{V_I^{Low} - V_I^{Up}} = \frac{S^{Up}(V_I^{Low} - V_I^{Up})}{V_I^{Low} - V_I^{Up}} = S^{Up}$$

or $V_I^i = V_I^{Up}$ $$S_3^i = \frac{S^{Up} - S^{Low}}{V_I^{Low} - V_I^{Up}} V_I^{Up} + \frac{S^{Low} V_I^{Low} - S^{Up} V_I^{Up}}{V_I^{Low} - V_I^{Up}} = \frac{S^{Low}(V_I^{Low} - V_I^{Up})}{V_I^{Low} - V_I^{Up}} = S^{Low}$$

Firstly, the system computes possible 4D trajectories for individual aircraft based on the aircraft location and speed data, and based on the aircraft type and specific characteristics (309). For example, certain types of aircrafts require longer/bigger separation distances then the others. The present invention generates and transmits to each and every aircraft a sequence of trajectory points based and tested by the system. The sequence is continuously updated. Between two consecutive sequences updates, the system checks the flight path till the end of landing.

The slope found above will now be used for computing the distance and/or time interval from arriving to starting trajectories line ($D_{BL}^i$) of landing with this slope.

Total duration $\tau = \tau_3 + \tau_4$ i.e. a sum of landing durations from starting points line until final approach with slope and time before that: moving with constant speed and height to $D_{BL}^i$. Let's denote average speed during $\tau_3^i$ by $V_A^i = (V_I^i + V_F^i)/2$, then (duration until starting trajectories line): $\tau_4^i$ depends on $$Z_0^i, V_A^i, \tau_i, S_3^i : S_3^i = \frac{Z_0^i}{\sqrt{(\tau_3^i V_A^i)^2 - (Z_0^i)^2}}),$$

then $$\tau_3^i = \frac{Z_0^i}{V_A^i S_3^i} \sqrt{1 + (S_3^i)^2} \Rightarrow \tau_4^i = \tau^i - \frac{Z_0^i}{V_A^i S_3^i} \sqrt{1 + (S_3^i)^2}$$

It means that the aircraft should fly with initial speed on initial height along computed trajectory during $\tau_4^i$ time units and after that to land with slope $S^i$ during $\tau_3^i$ time units.

And distance before landing is:

$$D_{BL}^i = \tau_4^i V_0^i$$

Next to the FIG. 3*b*.

Next, the system will find a variety of starting points for start of aircraft trajectory and compute individual aircraft trajectory (310). On the next step, the system will check if the distance from the aircraft current location to the nearest vertex in the starting points' arc line is less than the certain predetermined tolerance level (311). If it is, on the next stage, we check if more than one aircraft arrived to the trajectory starting points' line on the same time, if not, then the new updated aircraft data is checked, and the distance is checked relative to the tolerance until it is less then the permitted tolerance level.

Then, the 4D trajectory for the aircraft will be computed and sent to the aircraft (312) with the abovementioned (in 308) slope. To calculate the trajectory, we define aircraft heights by $H_I^{Low} \leq H_I^i \leq H_I^{Up}$ And then the length of this stage trajectory is defined by $$L_3^i = H_0^i / S_3^i$$

Deceleration $a^i$ of landing aircraft i-th supposed to be constant:

$$a^i = (V_0^i - V_f^i)/\tau_3^i$$

Current speed after j time duration of landing process is defined by:

$$V_j^i = V_0^i - a^i j$$

Then, radius of trajectory curvature for the landing aircraft i-th at time j is defined by:

$$R_j^i = (V_j^i)^2 / a^i.$$

Therefore, the radius gradually decreasing during landing (since current speed is also decreasing).

Angle between current speed at time j and next speed at time j+1 is denoted by:

$$\alpha_j^i = \pi - 2\beta_j^i,$$

Where $$\beta_j^i = \arctan \frac{V_j^i}{2R_j^i}$$

Next location of current landing plane is then denoted by:

$$x_{j+1}^i = V_j^i \cos\left(\gamma \sum_{i=0}^{i} \alpha_j^i\right) + x_j^i$$

$$y_{j+1}^i = V_j^i \sin\left(\gamma \sum_{i=0}^{i} \alpha_j^i\right) + y_j^i$$

$$z_j^i = z_0^i (L_3^i - \lambda_j^i) / L_3^i$$

$$\lambda_j^i = V_0^i j - a^i j^2 / 2$$

Trajectory can be computed in geographic coordinates and/or XY+UTM coordinates, so in above X,Y should be transformed to geographic latitude and longitude or computed just in geographic coordinates without X,Y transformation.

After trajectory will be sent to the aircraft, the system will check if the aircraft has deviated from the predefined safe trajectory (313). If distance from the predefined safe trajectory to the real time location is more than deviation tolerance then the system sends to the aircraft an instruction to return to the nearest available point of predefined trajectory with confirmation request (314), if not, the aircraft will continue with the given safe trajectory (315).

FIG. 4 graphically illustrates the five stages of the landing process. Beforehand, aircraft location entering the identification arc area will be determined (401). The model determines maximal amount of airplanes for landing/takeoffs pertinent to each airport with specific identification area parameters.

Thus, for each aircraft entering the identification arc location area, its trajectory from the identification point to the parking area will be determined, wherein a trajectory is defined as a time-ordered sequence of four-dimensional positions an aircraft follows from takeoff to landing, and can be described mathematically by a time-ordered set of four dimensional trajectory vectors, such a landing trajectory being divided into the five stages (segments), wherein these stages (segments) are numbered in reverse order: 5), 4), 3), 2), 1), and final approach point is considered as origin of the coordinates system $(X_{FA}, Y_{FA}, Z_{FA})=(0,0,0)$. The runway direction is the positive direction of the OX axis.

1. Segment 1 (402): The trajectory on the segment between the identification line and starting points' line will be further calculated, wherein the aircraft will fly with constant speed and vertical position, while taking into consideration safety regulations and regulatory distances and intervals.

2. Segment 2 (403): from the starting points' line to the start of descending, wherein the aircraft will fly with constant speed and vertical position until the start of the descent, while taking into consideration safety regulations and regulatory distances and intervals.

3. Segment 3 (404): from the start of descending until the final approach point with constant descent slope and constant deceleration such a trajectory determined as a succession of straight line segments.

4. Segment 4 (405): from the start of the final approach to the start of the to the touchdown point with constant deceleration and the slope of descent.

The slope remains constant during the third stage of landing:
$S_{3Max}^i = H_0^i / L_{3Min}^i$;
where $S_{3M}^i$ defines maximal allowable slope;

The minimal length of the landing trajectory on the third stage will be defined by:

$L_{3Min}^i = H_0^i / S_{3Max}^i$

And minimal time duration of the third stage will be defined by:

$$\tau_{3Min}^i = \frac{2H_0^i}{S_{3Max}^i(V_0^i + V_f^i)} = \frac{H_0^i}{S_{3Max}^i V_a^i},$$

where
$V_a^i$ is an average speed of current landing aircraft

Deceleration $a^i$ of landing aircraft i-th supposed to be constant:

$a^i = (V_0^i - V_f^i) / \tau_{3Min}^i$;

Current speed of the aircraft after j seconds of landing:

$V_j^i = V_0^i - a^i j$;

Radius of trajectory's curvature landing aircraft i-th at time j:

$R_j^i = (V_j^i)^2 / a^i$

Angle between current speed at time j and next speed at time j+1:

$\alpha_j^i = \pi - 2\beta_j^i$,

Where $$\beta_j^i = \arctan \frac{V_j^i}{2R_j^i}$$

Current length after j-th moment of landing will now be defined by:

$\lambda_j^i = V_0^i j - a^i j^2 / 2$

Next 3D location of the current landing aircraft will be:

$$x_{j+1}^i = V_j^i \cos\left(\rho \sum_{i=0}^i \alpha_j^i\right) + x_j^i$$

$$y_{j+1}^i = V_j^i \sin\left(\rho \sum_{i=0}^i \alpha_j^i\right) + y_j^i$$

$$z_j^i = z_f^i \lambda_j^i / L_{3Min}^i + z_0^i (L_{3Min}^i - \lambda_j^i) / L_{3Min}^i$$

5. Segment 5 (406): runway stage, from the touchdown point, through the runway to the passengers' sleeve or bus location with constant speed, deceleration and vertical position, as a succession of straight line segments.

Emergency Landings

Upon receiving a request for emergency landing of at least one aircraft, all scheduled takeoffs activities will be stopped until the end of emergency status.

Emergency landing means will include a special button means for the air traffic controller to exit the automated optimal trajectory means and enter the manual emergency mode means, in a case of runway emergency situation (such as landing/taking-off aircraft taking longer to clear the runway, oil or excessive ice on a runway). If landing/taking-off aircraft will take longer to clear the runway, the traffic lights system (described in details hereafter), will send an emergency alert. In such a situation, all landing aircraft trajectories will be altered with all the landing aircrafts doing go-around circles with current curvature radius and speed. All aircrafts scheduled for the takeoff will wait until the end of emergency status.

The changed trajectory for those aircrafts will be computed for current aircrafts' speeds and curvature radii.

Let's denote the moment of the emergency message obtaining as $\tau_E$, for aircraft i-th with speed $V_E^i$, location $P_E^i$ and radii: $R_E^i$ then changing of durations $\delta_E^i = 2\pi R_E^i / V_E^i$.

Then $R_E^i = \delta_E V_E^i / 2\pi$

Then for the time moment $\tau_E + j$, coordinates of the current position $P_{C,j}^i$ of each circulating aircraft should be:

$P_{C,j}^i = (C_{E,X}^i + R_C^i \cos(2\pi(\tau_E+j)/\delta_E), C_{C,Y}^i + R_C^i \sin(2\pi(\tau_E+j)/\delta_E), C_{C,Z}^i)$, Where
$j \in (0, \delta_E^i)$,
$C_{E,X}^i, C_{E,Y}^i$ are the coordinates of a circumference center of the aircraft.

Position of a circle center at the moment of emergency message $C_E^i$ should be computed by adding to current location of the aircraft the vector perpendicular to current speed, and with length $R_E^i$.

Let's denote previous location of the aircraft by $P_P^i$, then the vector of speed is parallel to $V_E^i = (P_E^i - P_P^i)$, then $(P_E^i - P_P^i) \cdot (C_E^i - P_E^i) = 0$ is the equation for unknown circle center $C_E^i$. Therefore $(P_{E,X}^i - P_{P,X}^i)(C_{E,X}^i - P_{E,X}^i) + (P_{E,Y}^i - P_{P,Y}^i)(C_{E,Y}^i - P_{E,Y}^i) = 0$ and $$C_{E,X}^i (P_{E,X}^i - P_{P,X}^i) = P_{E,X}^i (P_{E,X}^i - P_{P,X}^i) - C_{E,Y}^i (P_{E,Y}^i - P_{P,Y}^i) + P_{E,Y}^i (P_{E,Y}^i - P_{P,Y}^i)$$

Thus $$C_{E,X}^i = \alpha C_{E,Y}^i + \beta$$

Where $$\alpha = \frac{P_{P,Y}^i - P_{E,Y}^i}{P_{E,X}^i - P_{P,X}^i},$$

$$\beta = \frac{P_{E,X}^i (P_{E,X}^i - P_{P,X}^i) + P_{E,Y}^i (P_{E,Y}^i - P_{P,Y}^i)}{(P_{E,X}^i - P_{P,X}^i)}$$

The distance from the circumference center $C_E^i$ to the current location of aircraft $P_E^i$ should be equal to $R_C^i$:

$$(C_{E,X}^i - P_{E,X}^i)^2 + (C_{E,Y}^i - P_{E,Y}^i)^2 = (R_C^i)^2$$

After eliminating $C_{E,X}^i$:

$$(\alpha C_{E,Y}^i + \beta - P_{E,X}^i)^2 + (C_{E,Y}^i - P_{E,Y}^i)^2 = (R_C^i)^2$$

It is equivalent to:

$$(C_{E,Y}^i)^2 (1+\alpha^2) + 2C_{E,Y}^i (\alpha\beta - \alpha P_{E,X}^i - P_{E,Y}^i) + (\beta - P_{E,X}^i)^2 + (P_{E,Y}^i)^2 - (R_C^i)^2 = 0$$

After dividing by $1+\alpha^2$ and denoting:

$$B = \frac{(\alpha\beta - \alpha P_{E,X}^i - P_{E,Y}^i)}{1+\alpha^2},$$

$$C = \frac{(\beta - P_{E,X}^i)^2 + (P_{E,Y}^i)^2 - (R_C^i)^2}{1+\alpha^2}:$$

$$(C_{E,Y}^i)^2 + 2BC_{E,Y}^i + C = 0$$

Then $$C_{E,Y}^i = -B \pm \sqrt{B^2 - C}.$$

The sign of triangle rotation value $\gamma^i$ will be further defined by:

$$C_{E,Y}^i = -B + sgn\gamma^i \sqrt{B^2 - C}$$

And $$C_{E,X}^i = \alpha C_{E,Y}^i + \beta.$$

In both cases, the circles will be performed away from the runway, thus making the runway direction available as a default trajectory for emergency landing planes.

Thus $$C_{E,X}^i = \alpha(-B + sgn\gamma^i \sqrt{B^2 - C}) + \beta'.$$

Runways Scenarios

FIG. 5a graphically depicts different types of airport runways. The direction of the runway in use might change several times during the day, due to changes in light and weather conditions. Pilots prefer to take off and land facing into the wind. This has the effect of reducing the aircraft's speed over the ground (for the same given airspeed) and hence reducing the distance required to perform either maneuver. Runway orientation is determined from historical data of the prevailing winds in the area. This is especially important for single-runway airports that do not have the option of a second runway pointed in an alternative direction. A common scenario is to have two runways arranged at or close to 90 degrees to one another, so that aircraft can always find a suitable runway. Almost all runways are reversible, and aircraft use whichever runway in whichever direction is best suited to the wind. Additionally, there are noise restrictions that must be taken in account by inputting them into the system.

Our system works in such a way that the landing is preferably performed facing into the wind.

One runway airport is graphically presented in 501. In such airports, often landings and takeoffs are often performed in the same direction on the same time of the day due to the wing direction (e.g., both landings and takeoffs in the morning in the eastern direction, and in the evening the both in the western direction).

For the multi-runway airports, there are two major types of the runway configuration in the airports:

a. where the runways don't form an intersection (502). In such a scenario, usually the landing aircrafts (503) come from one direction, while other aircrafts perform takeoffs in the different direction (504);

b. where the runways form an intersection, i.e. crossing runways (505). In situation where the intersection exists, the landing aircrafts are simply prioritized over the taking-off aircrafts, while in airports without runway intersection, the identification arc location and the calculated trajectory differs between one airport to another based on the particular data from the each airport. Currently takeoffs in particular take longer, especially in the airports with runways with intersections.

For the multi-runway airports, according to the FAA Circular: "Advisory Circular 150/5300-13A, Airport Design", which includes recommendations for parallel runway separation, "For simultaneous landings and takeoffs using VFR, the minimum separation between centerlines of parallel runways is 700 feet (213 m)." "For simultaneous IFR operations, "Dual simultaneous precision instrument approaches are normally approved on parallel runway centerline separation of 4,300 feet (1311 m). On a case-by-case basis, the FAA will consider proposals utilizing separations down to a minimum of 3,000 feet (914 m) where a 4,300 foot (1311 m) separation is impractical. This reduction of separation requires special high update radar, monitoring equipment, etc."

FIG. 5b provides graphical illustration of landing/takeoff area in the parallel multi-runway airports' runways scenarios. Landing areas are larger than takeoffs areas since the landing aircrafts have the priority over the takeoff aircrafts.

System

The invention further includes an air traffic control landing/takeoff optimization system for determining a 4D trajectory for efficient landing sequence and landing time for a given set of aircrafts, the system comprising:

a centralized processor server unit for each airport air traffic control entity, such a unit being programmed: to receive and store a schedules data on landings and takeoffs from the said airport; to receive and store current location data and flight path data from all airplanes scheduled to land and takeoff at the said airport; to receive and to store flight safety regulations data; to perform landing and takeoffs optimization considering the safety regulations criteria through defining a special system of four dimensional coordinates (X,Y,Z,T) pertaining to the invented method, wherein the final approach point is defined as an origin of such system of coordinates, wherein X defines longitude, Y defined latitude, Z defines height, and T defines time; to define, individually for each particular airport, an aerial sector for landings, and an aerial sector for takeoffs in such a way that there is a safety interval between them to comply with standard industry security regulations; build a virtual arc-shaped line near the airport, called the identification arc, such an arc comprises a variety of identification points; to obtain the geographical coordinates and speed of each landing aircraft entering the identification arc area by checking if the aircraft is closer to the identification arc then the user-predetermined tolerance level collecting landing aircrafts location and speed data; determine, individually for each landing aircraft, the arc-shaped boundary line for that particular aircraft; to determine, individually for each landing aircraft, its landing slope percentage based on trajectory starting point and current speed, under minimal and maximal speed industry standard requirements; to check, individually for each aircraft, entering the starting points' arc location area, a list of possible safe landing trajectories from the starting points' line to the parking area, while taking in consideration other landing aircrafts possible landing trajectories, safe distances between them and industry-standard landings safety regulations and distances, wherein a trajectory is defined as a time-ordered sequence of four-dimensional positions; periodically check for each landing aircraft, if the distance from the aircraft current location to the nearest vertex in the arc-shaped boundary line from which all landing trajectories will start, is less than the user-determined tolerance level, until determining that such a distance is less than the abovementioned user-determined tolerance level;

means for sending aircraft location data to the centralized processor server unit;

a display device means for the human controller and one or more processors controlling the display device, wherein each air traffic control object includes a transmitter and receiver for bi-directional communications;

one or more processors means controlling said display device and configured to periodically receive a value representative of local air traffic conditions, periodically generate a display on said display device comprising a plurality of aircrafts located in the identification arc area; and on reception of a new said value, re-determine said aircraft trajectories;

means for sending four-dimensional safe landing trajectory to at least one aircraft entering the identification arc area. Such a means can have push-pull characteristics;

landing traffic lights system means, such a system having changing colors depending on the availability status of the runway, wherein the color will be red, and when the aircraft will leave the runway area, the sensors will be activated and the light will be turned to the green;

means for checking if the aircraft has deviated from the above provided four-dimensional safe landing trajectory, and, if distance from the said safe trajectory to the real time aircraft location is more than deviation tolerance, sending to the aircraft an instruction to return to the nearest available point of predefined trajectory above;

means for receiving, by a trajectory receiving unit in the aircraft, a trajectory defined by a series of four dimensional points elements of the airport domain, which elements the aircraft is to successively follow, with each element being comprised of at least two reference points which represent fixed geographical points of said airport domain. Such a means can have push-pull characteristics.

Device

Further disclosed a device for generating an optimized four dimensional trajectory for aircrafts for optimized landings, takeoffs sequence and time schedule, the device comprising:

identification arc location determining unit, such an identification arc comprises a variety of identification points;

geographical coordinates determining unit, the said unit determining for each aircraft entering the identification arc area, a variety of identification points from where the landing trajectories will begin;

trajectory receiving unit that receives a trajectory defined by a series of four dimensional points, where such points represent time-ordered sequence of three-dimensional aircraft positions;

coordinate extraction unit that obtains the three-dimensional geographical coordinates from the trajectory receiving unit that correspond to the elements of said trajectory that the aircraft is to successively follow; auxiliary path determining unit that determines, the points of an auxiliary trajectory;

safety separation determining unit that checks aircraft separation criteria and generates an alert if the distance between two or more aircrafts is less than the predefined separation criteria;

centralized processor server unit in data communication with each of the plurality of the workstations, said workstations comprising at least one controller workstation and at least one display monitor.

Takeoffs Traffic Lights System

FIG. 6 provides a graphical illustration of Takeoffs Traffic Lights System embodiment in the invented system. The Takeoffs Traffic Lights System will be mounted on the runway to increase the airport safety.

Currently, the required minimum visibility for instrument approaches is influenced by the presence and type of approach lighting system. Differently from the current situation, the traffic lights in the invented system will have changing green/red colors, similarly to the regular road traffic lights. When there is an aircraft on the runway, the color will be red, and when the aircraft will leave the runway area (go over the special line at the end of the runway), the sensors will be activated and the light will be turned to the green.

Such a Traffic Lights System includes the following main elements, wherein components of the system communicate through wireless and other forms of communication:

1. Central Traffic Lights Server (601) will be established. Such a server will be interconnected with the Central Processing Server Unit. The server will hold the operational database that stores controller data, monitors the system, and allows timing and other parameters to be modified;
2. Detectors (sensors) (602) are used to gather information about the "conditions" used in the local traffic signal controller at each intersection and to allocate time at the intersection. Stop-line detectors (at the start and at the end of the runway) will be used for safe green/red phase termination. Such sensors will operate in such a way, wherein the next available takeoff aircraft will be allowed to takeoff (green light phase) only after the runway will be cleared plus a certain tolerance level, and the aircraft will be allowed to takeoff (green light phase), after the runway will be cleared plus a certain tolerance level and next landing is planned to be finished after a certain tolerance level. In particular, if landing/taking-off aircraft will take longer to clear the runway than the maximal runway segment time duration defined by the user, the red light phase will be facilitated, and the system will initiate the emergency landing status.
3. The local controller (603) operates the displays through the load switches using the signal timing provided by the user;
4. Traffic lights (604) that work and change their color on aircrafts entering/vacating the runway. Such traffic lights might be installed on alongside the runway, from the both sides of the runway. Currently, using, the CAT I ILS approach without approach lights must have a minimum required visibility of ¾ mile, or 4000 foot runway visual range, so the traffic lights in the disclosed system will have characteristics to satisfy that CAT I ILS approach criteria, as well as a number of different regulations criteria.

The invention claimed is:

1. An air traffic control automated method for maximizing airport landing and takeoff capacity by generating an optimized landings and takeoffs queue and schedule for a plurality of aircrafts located in a vicinity of a specific airport through queuing the said aircrafts and determining an optimal four dimensional (4D) trajectory for efficient landing/takeoff sequence and time schedule, the method comprising the steps of:
   a. establishing a centralized processor server unit for each airport air traffic control entity;
   b. receiving and storing, at a centralized processor server, a schedules data on landings and takeoffs for a specific airport;
   c. receiving and storing, at the said server, current location data and flight path data from all airplanes scheduled to land and takeoff at the said airport; receiving and storing FAA (Federal Aviation Administration) flight safety regulations criteria data security regulations or EASA (European Aviation Safety Agency) security regulations, if the landing is performed in European airport; wherein a landing and takeoffs optimization is performed considering the abovementioned safety regulations criteria data, according to the steps mentioned below;
   d. defining a special system of four dimensional coordinates (X,Y,Z,T) pertaining to the method, wherein the final approach point is defined as an origin of such system of coordinates, wherein X defines longitude, Y defined latitude, Z defines height, and T defines time;
   e. defining, individually for each particular airport, an aerial sector for landings, and an aerial sector for takeoffs in such a way that there is a safety distance interval between them to comply with FAA (Federal Aviation Administration) security regulations or EASA (European Aviation Safety Agency) security regulations, if the landing is performed in European airport;
   f. building a virtual arc-shaped line near the airport, called an identification arc, such identification arc comprises a variety of identification points;
   g. obtaining geographical coordinates and speed of each landing aircraft entering the identification arc area by checking if the aircraft is closer to the identification arc then a user predetermined tolerance level collecting landing aircrafts location and speed data;
   h. determining, independently for each landing aircraft, an individual arc-shaped boundary line for that particular aircraft, called starting points line, such a line will be determined in such a way that landing time duration from that line until the end of landing will be identical for all landing aircrafts;
   i. if two or more aircrafts arrive at the same time to the identification line, adjusting the trajectory on a segment between the identification line and a starting points' line by calculating the starting points lines for those particular aircrafts in such a way that they will arrive to the starting points line with the certain time difference larger than a predetermined safety time interval, wherein the aircraft will fly on this segment with constant speed and vertical position, while taking into consideration safety regulations and FAA/EASA regulatory distances and intervals;
   j. determining, individually for each landing aircraft, its landing slope percentage based on trajectory starting point and current speed, under minimal and maximal speed and slope FAA/EASA requirements;
   k. checking, individually for each aircraft, entering the starting points arc location area, a list of possible safe landing trajectories from the point on that arc to the parking area, while taking in consideration another landing aircrafts possible landing trajectories, safe distances between them and FAA/EASA landings safety regulations and distances, wherein a trajectory is defined as a sequence of four-dimensional positions that an aircraft follows, such a landing trajectory being determined in such a way that being divided into the five segments:
   1) from the identification line to the starting points' line, such a trajectory will be determined with constant speed and vertical position; 2) from the starting points' arc point to the start of descending, such a trajectory will be determined with constant speed and vertical position; 3) from the start of descending until a final approach point with constant descent slope and constant deceleration, wherein such a trajectory is in the arc form; 4) from the start of the final approach to a touchdown point with constant deceleration and the slope of descent, as a succession of straight line segments; 5) runway segment, from the touchdown point, through the runway to a passengers sleeve location or bus location with constant speed, deceleration and vertical position, as a succession of straight line segments;
   l. periodically checking for each landing aircraft, if the distance from the aircraft current location to the nearest vertex in the arc-shaped boundary line from which all landing trajectories will start, is less than a user-determined tolerance level, until determining that such a distance is less than the abovementioned user-determined tolerance level;
   m. sending four-dimensional safe landing trajectory to the aircraft;
   and, n. checking if the aircraft has deviated from the above provided four-dimensional safe landing trajectory, and, if distance from the said safe trajectory to the real time aircraft location is more than deviation tolerance, sending to the aircraft an instruction to return to the nearest available point of predefined trajectory above.

2. The method of claim 1, further comprising converting, by a conversion unit, the obtained geographical coordinates into a X,Y coordinates, or X,Y coordinates plus (Universal Transverse Mercator) UTM coordinates tied to the airport data to adjust the data received to the data type available in the system.

3. The method as claimed in claim 1, that further determines maximal amount of airplanes for landings and takeoffs pertinent to each runway with specific identification area parameters.

4. The method of claim 1, further comprising providing an alert to the pilots and to the airport' air traffic control unit if deviation from the planned trajectory is detected, and further generating a new trajectory taking in consideration all current safety constrains.

5. The method of claim 1, wherein a runway can operate in a landings only mode or takeoffs only mode or both landings and takeoffs on the same runway mode.

6. The method according to claim 1, wherein the trajectory starts at a runway leave point.

7. The method of claim 1 that could be used either as an automatic or as a decision-support method for air traffic control personnel.

8. The method of claim 1 for altering landing schedules in a case of runway emergency, comprising receiving a runway emergency notice, and making one or more changes in landing trajectory of all landing aircrafts, wherein the landing trajectories of all landing aircrafts will reflect delay in their landing, wherein all the landing aircrafts will perform a go-around circles with current curvature radius and speed, such circles will be performed away from the shortest landing route and from the runway, and all aircrafts scheduled for the takeoff will not takeoff until the end of emergency status.

9. An air traffic control automated system for maximizing airport landing and takeoff capacity by generating an optimized landings and takeoffs schedule for a plurality of aircrafts located in a vicinity of a specific airport, through determining an optimal four dimensional (4D) trajectory for efficient landings and takeoffs sequence and time schedule for each runway, the air traffic control system comprising:
  a centralized processor server unit for each airport air traffic control entity, such a unit being programmed: to receive and store a schedules data on landings and takeoffs from a specific airport;
  to receive and store current location data and flight path data from all airplanes scheduled to land and takeoff at the said airport; receiving and storing flight safety FAA/EASA regulations data; to perform landing and takeoffs optimization considering the safety regulations criteria through defining a special system of four dimensional coordinates (X,Y,Z,T) pertaining to the method, wherein a final approach point is defined as an origin of such system of coordinates, wherein X defines longitude, Y defined latitude, Z defines height, and T defines time; define, individually for each particular airport, an aerial sector for landings, and an aerial sector for takeoffs in such a way that there is a safety interval between them to comply with FAA/EASA security regulations;
  build a virtual arc-shaped line near the airport, called an identification arc, such an arc comprises a variety of identification points; obtain geographical coordinates and speed of each landing aircraft entering the identification arc area by checking if the aircraft is closer to the identification arc then a certain user-predetermined tolerance level collecting landing aircrafts location and speed data; determine, individually for each landing aircraft, an arc-shaped boundary line called a starting points line; determine, individually for each landing aircraft, its landing slope percentage based on trajectory starting point and current speed, under minimal and maximal speed FAA/EASA requirements;
  means for checking, individually for each aircraft, entering the starting points line location area, a list of possible safe landing trajectories from the starting points line to the parking area, while taking in consideration another landing aircrafts possible landing trajectories, safe distances between them and FAA/EASA landings safety regulations and distances, wherein a trajectory is defined as a time-ordered sequence of four-dimensional positions;
  means for checking the time of arriving to the identification arc location, while taking into consideration safety regulations and regulatory distances and intervals from one landing aircraft to another landing aircraft, or to the aircrafts scheduled to takeoff, and if the difference between landing aircrafts at the identification points' line is smaller than both the FAA/EASA safety regulations and regulatory distances, and an user-determined tolerance level, then recalculating a potential list of possible safe landing trajectories from the identification line to the starting points line in such a way that the aircrafts will arrive to the starting points line with the certain time difference larger than the predetermined safety time interval; periodically check for each landing aircraft, if the distance from the aircraft current location to the nearest vertex in the arcshaped boundary line from which all landing trajectories will start, is less than the userdetermined tolerance level, until determining that such a distance is less than the abovementioned user-determined tolerance level;
  means for sending aircraft location data to the centralized processor server unit;
  a display device for a human controller and one or more processors controlling the display device, wherein each air traffic control object includes a transmitter and receiver for bidirectional communications;
  one or more processors controlling said display device and configured to periodically receive a value representative of local air traffic conditions, periodically generate a display on said display device comprising a plurality of aircrafts located in the identification arc area; and on reception of a new said value, re-determine said aircraft trajectories;
  means for sending four-dimensional safe landing trajectory to at least one aircraft entering the identification arc area;
  landing traffic lights system, such a system having changing colors depending on the availability status of the runway, wherein the color will be red, and when the aircraft will leave the runway area, the sensors will be activated and the light will be turned to the green;
  means for checking if the aircraft has deviated from the above provided four-dimensional safe landing trajectory, and, if distance from the said safe trajectory to the real time aircraft location is more than deviation tolerance, sending to the aircraft an instruction to return to the nearest available point of predefined trajectory above;
  means for receiving, by a trajectory receiving unit in the aircraft, a trajectory defined by a series of four dimensional points elements of the airport domain, which elements the aircraft is to successively follow, with each element being comprised of at least two reference points which represent fixed geographical points of said airport domain;
  means for switching the system mode from automatic system to decision support system, and from decision support system to automatic system;

means for switching the system mode from regular system mode to emergency system mode in airport emergency scenario.

10. A device for generating an optimized four dimensional trajectory for aircrafts for optimized landings, takeoffs sequence and time schedule, the device comprising:
- identification arc location determining unit, such an identification arc comprises a variety of identification points;
- geographical coordinates determining unit, the said unit determining for each aircraft entering the identification arc area, a variety of identification points from where the landing trajectories will begin;
- trajectory receiving unit that receives a trajectory defined by a series of four dimensional points, where such points represent time-ordered sequence of three-dimensional aircraft positions;
- coordinate extraction unit that obtains the geographical coordinates from the trajectory receiving unit that correspond to the elements of said trajectory that the aircraft is to successively follow;
- safety separation determining unit that checks aircraft separation criteria and generates an alert if a distance between two or more aircrafts is less than a predefined separation criteria;
- emergency landing unit that receives an emergency landing request and, following that, exits an automated optimal trajectory mode and enter a manual emergency mode to allow for the emergency landing airplane to land as quickly as possible; centralized processor server unit in data communication with each of the plurality of the air traffic control computers.

11. A system of claim 9, further comprising a takeoffs traffic lights system having changing colors depending on a free status of the runway, wherein the color will be red when the runway is not clear, thus, not available for the takeoff; and will be green when the runway area will be clear for the takeoff, in such a situation, the sensors will be activated when the previously landed or taking off aircraft will clear the runway by crossing over a special line at the end of the runway, such a system comprising:
- Central Traffic Lights Server to be established and interconnected with the Central Processing Server Unit, the said Central Traffic Lights Server will hold an operational database that stores controllers data, monitors the system, and allows timing and other parameters to be modified;
- traffic lights, in connection with the Central Traffic Lights Server, such traffic lights change their color on aircrafts entering and vacating the runway, such traffic lights will be installed alongside the runway, from the both sides of the runway;
- a local controller, such a controller operates the traffic lights through the load switches using the signal timing provided by the user of the system;
- detecting sensors that will be used to gather information about the conditions used in the local traffic signal controller and allocate time at the intersection;
- stop-line detectors that will be used for safe green and red phase termination, such sensors will operate for landings and takeoffs, wherein the next available landing aircraft will be allowed to land only after the runway will be cleared plus a certain tolerance level and the aircraft will be allowed to takeoff, after the runway will be cleared plus a certain tolerance level.

12. The method of claim 11, further comprising facilitating a red light phase alert and initiating the emergency landing status, if landing or taking-off aircraft will take longer to clear the runway than a maximal runway segment time duration, as defined by the user;
- means for checking, individually for each aircraft, entering a starting points line location area, a list of possible safe landing trajectories from the starting points line to a parking area, while taking in consideration another landing aircrafts possible landing trajectories, safe distances between them and FAA/EASA landings safety regulations and distances, wherein a trajectory is defined as a time-ordered sequence of four-dimensional positions.

* * * * *